US012802022B2

(12) United States Patent
Huang

(10) Patent No.: US 12,802,022 B2
(45) Date of Patent: Nov. 17, 2026

(54) ARTIFICIAL INTELLIGENCE FOR GENERATING RECOMMENDATIONS FOR PACKING ITEMS

(71) Applicant: United Parcel Service of America, Inc., Atlanta, GA (US)

(72) Inventor: Ling-Ya Huang, Redmond, WA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/956,426

(22) Filed: Nov. 22, 2024

(65) Prior Publication Data

US 2025/0165905 A1 May 22, 2025

Related U.S. Application Data

(60) Provisional application No. 63/602,203, filed on Nov. 22, 2023.

(51) Int. Cl.

*G06Q 10/0832* (2023.01)
*G06T 7/62* (2017.01)
*G06V 20/70* (2022.01)

(52) U.S. Cl.

CPC .......... *G06Q 10/0832* (2013.01); *G06T 7/62* (2017.01); *G06V 20/70* (2022.01)

(58) Field of Classification Search

CPC ... G06Q 10/08–087; G06T 7/62; G06V 20/70
USPC ........................................................ 705/332
See application file for complete search history.

(56) References Cited

U.S. PATENT DOCUMENTS

| | | | | |
|---|---|---|---|---|
| 6,721,762 | B1 * | 4/2004 | Levine .................. | G06Q 10/08 707/999.102 |
| 9,142,035 | B1 | 9/2015 | Rotman et al. | |
| 9,235,822 | B2 | 1/2016 | Tian et al. | |
| 11,479,379 | B1 | 10/2022 | Gasperino et al. | |
| 2013/0218799 | A1 | 8/2013 | Lehmann et al. | |
| 2015/0332216 | A1 | 11/2015 | Doshi et al. | |
| 2020/0057988 | A1 * | 2/2020 | Streebin ............ | G06Q 10/0831 |
| 2021/0279957 | A1 * | 9/2021 | Eder ...................... | G06F 16/29 |

(Continued)

FOREIGN PATENT DOCUMENTS

CN 104246801 A 12/2014

OTHER PUBLICATIONS

Othman, Nashwan Adnan, et al. "An embedded real-time object detection and measurement of its size." 2018 International Conference on Artificial Intelligence and Data Processing (IDAP). IEEE, 2018. (Year: 2018).*

(Continued)

*Primary Examiner* — Michael P Harrington
*Assistant Examiner* — Brian A Tallman
(74) *Attorney, Agent, or Firm* — Shook, Hardy & Bacon L.L.P.

(57) ABSTRACT

The disclosure provided herein relates to artificial intelligence type computers and digital data processing systems and corresponding data processing methods and products for emulation of intelligence in generating recommendations for packing items. In general, various embodiments of the present disclosure provide systems, methods, apparatuses, and technologies, and/or the like for providing novel artificial intelligence (AI) functionality for generating a recommendation on packing an item or combination of items.

19 Claims, 11 Drawing Sheets

(56) References Cited

U.S. PATENT DOCUMENTS

| | | | |
|---|---|---|---|
| 2021/0304109 | A1 | 9/2021 | Kulkarni Wadhonkar et al. |
| 2022/0374834 | A1* | 11/2022 | Lundeen ............... B60P 1/6409 |
| 2023/0072171 | A1* | 3/2023 | Sengupta ............... G06N 3/086 |
| 2023/0394686 | A1* | 12/2023 | Min ..................... G06V 10/751 |
| 2025/0046429 | A1* | 2/2025 | Haghighi ............... G16H 50/20 |

OTHER PUBLICATIONS

Extended European Search Report received for European Patent Application No. 24214543.1, mailed on Mar. 31, 2025, 16 pages.

* cited by examiner

ARTIFICIAL INTELLIGENCE FOR GENERATING RECOMMENDATIONS FOR PACKING ITEMS

CROSS REFERENCE TO RELATED APPLICATIONS

This application claims priority from U.S. Provisional Patent Application Ser. No. 63/602,203, filed Nov. 22, 2023, the disclosure of which is hereby incorporated herein by reference in its entirety.

TECHNICAL FIELD

The disclosure provided herein relates to artificial intelligence type computers and digital data processing systems and corresponding data processing methods and products for emulation of intelligence in generating recommendations for packing items.

BACKGROUND

A frustrating situation for many individuals who are shipping one or more items is how to best pack the item(s) for shipment with a carrier such as United Parcel Service, the United States Postal Office, and/or the like. Although correctly selecting an appropriate package type (e.g., envelope, box, tube, etc.) and correctly packing an item or combination of items into the package type to minimize wasted space, minimize shipping costs, and to ensure the safety of the item(s) during shipping may seem like a trivial task, for most individuals, doing so, is anything but trivial and can prove to be quite a complex and challenging task. Accordingly, various embodiments of the disclosure provided herein help individuals to overcome the challenges associated with packing items for shipment.

SUMMARY

This summary is intended to introduce a selection of concepts in a simplified form that is further described below in the detailed description section of this disclosure. This summary is not intended to identify key or essential features of the claimed subject matter, nor is it intended to be used as an aid in isolation to determine the scope of the claimed subject matter.

In general, various embodiments of the present disclosure provide methods, apparatuses, systems, computing devices, computing entities, and/or the like for providing novel artificial intelligence (AI) functionality for generating recommendations for packing items. In various aspects of the disclosure, a method is provided that comprises: receiving, by computing hardware and from a user computing device, a request for a recommendation for packing an item, a first image of a top view of the item and a reference item, and a second image of a front view of the item and the reference item, wherein the request identifies reference dimensions for the reference item; processing, by the computing hardware, the first image and the second image using at least one machine learning model to: generate a first bounding box around the reference item and a second bounding box around the item in the first image, generate a third bounding box around the reference item and a fourth bounding box around the item in the second image, and generate a prediction of a label for the item based at least in part on a texture of the item detected from at least one of the first image or the second image; comparing, by the computing hardware and based at least in part on the reference dimensions, the first bounding box to the second bounding box and the third bounding box to the fourth bounding box to generate dimensions of the item; processing, by the computing hardware using a rules-based model, the prediction of the label for the item and the dimensions to generate the recommendation for packing the item, wherein the recommendation identifies a recommended package type to use in packing the item; and communicating, by the computing hardware, the recommendation to the user computing device.

In some embodiments, the dimensions comprise a width, a height, and a depth of the item, comparing the first bounding box to the second bounding box involves deriving the width and the height of the item, and comparing the third bounding box to the second bounding box involves deriving the depth of the item. In some embodiments, the rules-based model applies a set of rules based at least in part on package dimensions for each package type of a plurality of package types to the dimensions of the item to identify the recommended package type to use in packing the item.

In some embodiments, the prediction of the label identifies the item as fragile or non-fragile. In some embodiments, the recommendation identifies a recommended filler material to use in packing the item in the recommended package type. In some embodiments, the rules-based model applies a set of rules based at least in part on using different types of filler material with respect to the recommended package type and the dimensions to identify the recommended filler material from the different types of filler material.

In some embodiments, the request comprises a description of the item, the recommendation comprises an estimated cost for shipping the item, and the method further comprises: generating, by the computing hardware and based at least in part on the description and the dimensions, an estimated weight of the item; and generating, by the computing hardware and based at least in part on the estimated weight, the estimated cost.

In additional aspects of the disclosure, a system is provided that comprises a non-transitory computer-readable medium storing instructions and a processing device communicatively coupled to the non-transitory computer-readable medium. The processing device is configured to execute the instructions and thereby perform operations comprising: receiving, from a user computing device, a request for a recommended package type for an item, a first image of a top view of the item and a reference item, and a second image of a front view of the item and the reference item, wherein the request identifies reference dimensions for the reference item; receiving identification of a first bounding box, a second bounding box, a third bounding box, a fourth bounding box, wherein at least one machine learning model processes the first image and the second image to: generate the first bounding box around the reference item and the second bounding box around the item in the first image, and generate the third bounding box around the reference item and the fourth bounding box around the item in the second image; comparing, based at least in part on the reference dimensions, the first bounding box to the second bounding box and the third bounding box to the fourth bounding box to generate dimensions of the item; processing, using a rules-based model, the dimensions to generate the recommended package type to use in packing the item; and communicating the recommended package type to the user computing device.

In some embodiments, the operations further comprise: receiving identification of a prediction of a label for the item, wherein the at least one machine learning model processes at least one of the first image or the second image to generate the prediction of the label for the item; responsive to the prediction of the label identifying the item as fragile, processing, using the rules-based model, the dimensions and the recommended package type to generate a recommended filler material to use in packing the item in the recommended package type; and communicating the recommended filler material to the user computing device. In some embodiments, the rules-based model applies a set of rules based at least in part on using different types of filler material with respect to the recommended package type and the dimensions to identify the recommended filler material from the different types of filler material.

In some embodiments, the operations further comprise receiving identification of a prediction of a label for the item, wherein the at least one machine learning model processes at least one of the first image or the second image to generate the prediction of the label for the item, and generating the recommended package type is further based at least in part on the prediction of the label for the item. In some embodiments, the dimensions comprise a width, a height, and a depth of the item, comparing the first bounding box to the second bounding box involves deriving the width and the height of the item, and comparing the third bounding box to the second bounding box involves deriving the depth of the item. In some embodiments, the rules-based model applies a set of rules based at least in part on package dimensions for each package type of a plurality of package types to the dimensions of the item to identify the recommended package type to use in packing the item. In some embodiments, the request comprises a description of the item, and the operations further comprise: generating, based at least in part on the description and the dimensions, an estimated weight of the item; generating, based at least in part on the estimated weight, an estimated cost for shipping the item; and communicating the estimated cost to the user computing device.

In additional aspects of the disclosure, a computer-readable medium storing computer-executable instructions is provided. The computer-executable instruction that, when executed by computing hardware, configure the computing hardware to perform operations comprising: receiving, from a user computing device, a request for a recommended package type for a first item and a second item, a first image of a top view of the first item and a reference item, a second image of a front view of the first item and the reference item, a third image of a top view of the second item and the reference item, and a fourth image of a front view of the second item and the reference item; receiving identification of a first bounding box, a second bounding box, a third bounding box, a fourth bounding box, a fifth bounding box, a sixth bounding box, seventh bounding box, and an eighth bounding box, wherein at least one machine learning model processes the first image, the second image, the third image, and the fourth image to: generate the first bounding box around the reference item and the second bounding box around the first item in the first image, generate the third bounding box around the reference item and the fourth bounding box around the first item in the second image, generate the fifth bounding box around the reference item and the sixth bounding box around the second item in the third image, and generate the seventh bounding box around the reference item and the eighth bounding box around the second item in the fourth image; comparing, based at least in part on reference dimensions for the reference item, the first bounding box to the second bounding box and the third bounding box to the fourth bounding box to generate first dimensions of the first item; comparing, based at least in part on the reference dimensions for the reference item, the fifth bounding box to the sixth bounding box and the seventh bounding box to the eighth bounding box to generate second dimensions of the second item; processing the first dimensions and the second dimensions to generate the recommended package type to use in packing the first item and the second item together; and communicating the recommended package type to the user computing device.

In some embodiments, the operations further comprise: receiving identification of a first prediction of a first label for the first item and a second prediction of a second label for the second item, wherein the at least one machine learning model processes at least one of the first image or the second image to generate the first prediction and processes at least one of the third image or the fourth image to generate the second prediction; responsive to at least one of the first prediction identifying the first item as fragile or the second prediction identifying the second item as fragile, processing the first dimensions, the second dimensions, and the recommended package type to generate a recommended filler material to use in packing the first item and the second item in the recommended package type; and communicating the recommended filler material to the user computing device. In some embodiments, processing the first dimensions, the second dimensions, and the recommended package type to generate the recommended filler material involves processing the first dimensions, the second dimensions, and the recommended package type via a rules-based model that applies a set of rules based at least in part on using different types of filler material with respect to the first dimensions, the second dimensions, and the recommended package type to identify the recommended filler material from the different types of filler material.

In some embodiments, the first dimensions comprise a first width, a first height, and a first depth of the first item, the second dimensions comprise a second width, a second height, and a second depth of the second item, comparing the first bounding box to the second bounding box involves deriving the first width and the first height of the first item, comparing the third bounding box to the second bounding box involves deriving the first depth of the first item, comparing the fifth bounding box to the sixth bounding box involves deriving the second width and the second height of the second item, and comparing the seventh bounding box to the eighth bounding box involves deriving the second depth of the second item. In some embodiments, processing the first dimensions and the second dimensions to generate the recommended package type involves processing the first dimensions and the second dimensions via a rules-based model that applies a set of rules based at least in part on package dimensions for each package type of a plurality of package types to the first dimensions and the second dimensions to identify the recommended package type to use in packing the first item and the second item together. In some embodiments, the request comprises a first description of the first item and a second description of the second item, and the operations further comprise: generating, based at least in part on the first description and the first dimensions, a first estimated weight of the first item; generating, based at least in part on the second description and the second dimensions, a second estimated weight of the second item; generating, based at least in part on the first estimated weight and the second estimated weight, an estimated cost for shipping the first item and the second item together; and communicating the estimated cost to the user computing device.

BRIEF DESCRIPTION OF THE DRAWINGS

The present systems, methods, and apparatuses for providing artificial intelligence for generating packing recommendations for items are described in detail in connection with the attached drawing figures, which illustrate non-limiting examples of the disclosed subject matter, wherein.

DETAILED DESCRIPTION

Figure 1:
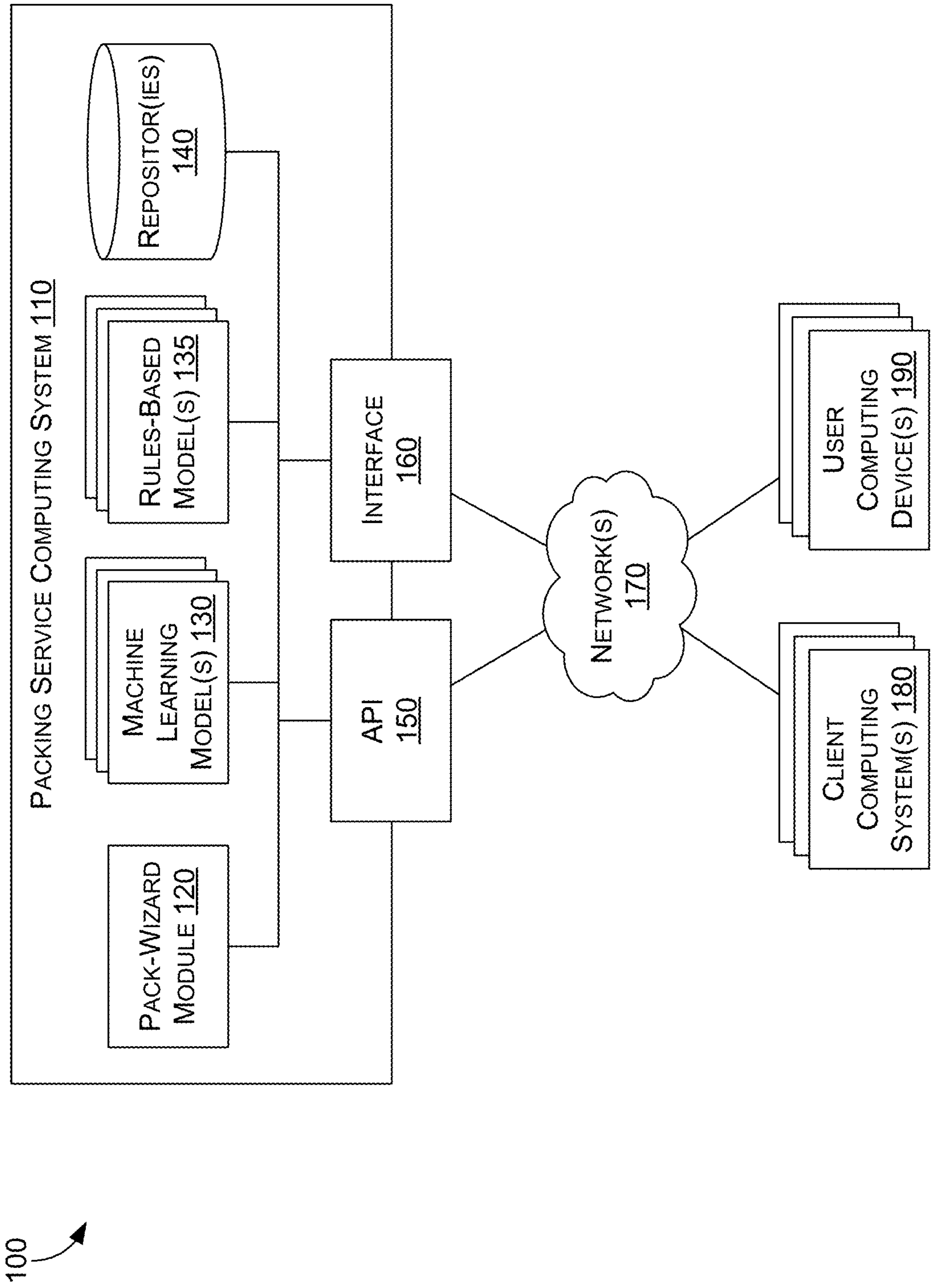
FIG. 1 depicts an example of a computing environment that can be used for providing artificial intelligence for generating recommendations for packing items in accordance with various embodiments of the present disclosure.

This detailed description is provided in order to meet statutory requirements. However, this description is not intended to limit the scope of the disclosure. Rather, the claimed subject matter may be embodied in other ways, including different steps, different combinations of steps, different operations, different combinations of operations, different elements and/or components, and/or different combinations of elements and/or components, similar to those described in this disclosure and in conjunction with other present or future technologies and solutions. Moreover, although the term “Operation” may be used herein to identify different elements of methods employed, the term should not be interpreted as implying any particular order among or between different elements except when the order is explicitly described as such.

Overview

A frustrating situation for many individuals who are shipping one or more items is how to best pack the item(s) for shipment with a carrier such as United Parcel Service, the United States Postal Office, and/or the like. For example, selecting the correct package type (e.g., box) for an individual’s needs necessitates a correct balance between the size of the item(s) the individual is shipping, and the dimensions of the package type needed to ship such item(s). Selecting a package type that is too large for the item(s) can waste valuable space and incur additional charges since many carriers use dimensional weight in calculating shipping costs. On the other hand, selecting a package type that is too small can result in packing the item(s) in such a manner that can increase the likelihood of the item(s) being damaged during shipping.

Although certain individuals, such as highly trained employees of shipping stores (e.g., the UPS Store), may be sufficient in selecting the correct package type to use in shipping an item or combination of items, most individuals (e.g., consumers) are not. This is especially true when an individual is shipping an item or combination of items that are oddly shaped with respect to the shapes of the available package types. For example, when an individual is shipping an item or combinations of items that are not shaped as standard geometric shapes, such as a square or a rectangle, determining the package type that can accommodate the oddly shaped items can prove to be a significant challenge.

Further, most individuals are not sufficiently capable of recognizing when filler material is needed in packing an item to ensure the item is not damaged during shipment, as well as the type of filler material needed. For example, most individuals are not sufficiently capable of recognizing when and what filler material may be needed such as cell bubble sheeting, peanuts, foam planks, and/or the like that will best protect an item during shipping.

Therefore, although correctly selecting an appropriate package type (e.g., envelope, box, tube, etc.) and correctly packing an item or combination of items into the package type to minimize wasted space, minimize shipping costs, and to ensure the safety of the item(s) during shipping may seem like a trivial task, for individuals, doing so, is anything but trivial and can prove to be quite a complex task. That is to say, for most individuals, correctly selecting an appropriate package type for shipping an item or combination of items and then correctly packing the item or combination of items into the package type is not a task that can be practically performed in the human mind.

Further, technology is not readily available to aid these individuals in correctly selecting an appropriate package type for shipping an item or combination of items and/or correctly packing the item or combination of items into the package type. Although software applications (e.g., mobile applications) have been developed and made available to assist individuals (e.g., consumers) with measuring the dimensions of an item, such software applications are insufficient in assisting an individual in correctly selecting an appropriate package type for shipping an item or combination of items, as well as assisting the individual in correctly packing the item or combination of items into the package type.

For example, a mobile application named Photo Ruler is available that uses augmented reality to allow individuals (consumers) to accurately tape measure the size of an item using the individual’s camera on his or her mobile device. However, the Photo Ruler mobile application does just that, provides an accurate measure of the size of an item. The Photo Ruler mobile application does not assist the individual in identifying what appropriate package type is needed to ship the item, or whether filler material is needed to safely ship the item. This is especially true for an instance where an individual is interested in shipping a combination of items to a same destination. Therefore, the Photo Ruler mobile application is insufficient in assisting an individual in correctly selecting an appropriate package type for shipping an item or combination of items, as well as assisting the individual in correctly packing the item or combination of items into the package type.

Other software applications are available to assist e-commerce retailers in determining shipping requirements for items purchased by visitors to their websites. However, these software applications are insufficient in assisting an individual, especially a consumer, in correctly selecting an appropriate package type for shipping an item or combination of items, as well as assisting the individual in correctly packing the item or combination of items into the package type.

For example, an application named Boxify is available for use by e-commerce retailers who are utilizing the Shopify e-commerce platform as an online store. The Boxify application can help an e-commerce retailer determine the smallest box required to hold every item found in a visitor's shopping cart and provide real-time shipping rates for various carriers in using the smallest box. However, to do so, the e-commerce retailer is required to provide the Boxify application with the dimensions of the items to be shipped. The Boxify application does not have functionality/capabilities to determine the dimensions of the items. Therefore, the Boxify application is quite limited in assisting an e-commerce retailer in identifying the appropriate package type (e.g., box) to use in shipping purchased items to consumers/purchasers. In addition, the Boxify application is only available to e-commerce retailers, and not to e-commerce consumers/purchasers. Therefore, the Boxify application is insufficient in assisting an individual, and especially a consumer/purchaser, in correctly selecting an appropriate package type for shipping an item or combination of items, as well as assisting the individual in correctly packing the item or combination of items into the package type.

Various embodiments of the present disclosure address these technical challenges by providing a packing service that is available to shippers that can include both retailers and consumers. The packing service utilizes novel artificial intelligence in identifying and recommending an appropriate package type to use in shipping an item or combination of items, as well as provides guidance on whether and what type of filler material should be used in packing the item or combination of items into the recommended package type. For example, such a service may be provided through an application programming interface that can be embedded in an application (e.g., an e-commerce retailer's web application) so that requests can be submitted through the application to the service. In another example, such a service may be provided through an interface such as an application (e.g., mobile application) that can be installed on an individual's user computing device or a website that can be visited by an individual through a browser application installed on his or her user computing device.

In particular embodiments, an individual may submit a request to the packing service for a recommendation for packing an item along with one or more images of the item to be packed. For example, the images may include a first image of a top view of the item along with a reference item. The reference item is generally an item for which the dimensions of the item are known. For example, the reference item may be a package type, such as a box, which is a stock package type made available by a package carrier that can be used in shipping items with the package carrier and for which the dimensions of the stock package type are known. The individual may identify the stock package type along with the request and/or the first image providing the top view of the item and reference item. In another example, the reference item may be an item that is not necessarily a package type, or a stock package type. Here, the individual may provide the dimensions of the reference item along with the request and/or first image of the item and reference item. For example, the individual may provide a height, width, and/or depth of the reference item provided in the first image along with the item.

In addition to the first image of the top view, the images may include a second image of a front view of the item and the reference item. Again, the individual may identify the particular type of reference item (e.g., stock package type) found in the second image, or the individual may identify the dimensions of the reference item (e.g. the depth) found in the second image. In other embodiments, the individual may use a "default" reference item in the first and second images that the dimensions to the reference item are already know to the packing service without any input needed by the individual. Generally, the first and second images will include the same reference item. However, the first and second images can include different reference items.

In various embodiments, the packing service makes use of novel artificial intelligence ("AI") in processing the first and second images to generate dimensions for the item that can then be used in generating a recommendation for packing the item. In particular embodiments, the packing service involves processing the first image and the second image using at least one machine learning model. For example, the machine learning model may be a deep learning model such as a convolutional neural network that has been trained on training images of items and reference items that have been labeled accordingly. As a specific example, the machine learning model may be trained using training images in which the items and reference items have been outlined with a bounding box and labeled as fragile (delicate), non-fragile (non-delicate), or reference item. Therefore, the machine learning model is trained on the training images until the model can recognize items and reference items within testing images (e.g., with a corresponding bounding box) and predict their labels correctly to a satisfactory level (e.g., threshold level) of precision, recall, and accuracy.

The packing service may have the first image processed using the at least one machine learning model to generate a first bounding box around the reference item and a second bounding box around the item in the first image. In addition, the packing service may have the second image processed using the at least one machine learning model to generate a third bounding box around the reference item and a fourth bounding box around the item in the second image. Additionally, or alternatively, the packing service may have at least one of the first image or the second image processed by the at least one machine learning model to generate a prediction of a label for the item based at least in part on a texture of the item detected from the first image and/or the second image.

The packing service may then involve comparing the first bounding box to the second bounding box generated for the reference item and the item shown in the first image to generate dimensions for the item. In particular embodiments, the packing service is able to conduct the comparison based at least in part on the reference dimensions of the reference item. More specifically, the packing service can determine the dimensions of the item by establishing a measurement scale based at least in part on the reference dimensions and the first bounding box generated around the reference item shown in the first image.

For example, the packing service may establish that a certain number of pixels (e.g., 40 pixels, 30 pixels, etc.) in the image is equal to a certain measurement (1 inch, 1 cm, etc.) based at least in part on the reference (known) dimensions of the reference item and the first bounding box generated around the reference item in the first image. The packing service may then apply the measurement scale to the second bounding box generated around the item shown in the first image to determine dimensions of the item. For example, the packing service may apply the measurement scale to the second bounding box generated around the item in the first image to determine a height and width of the item.

The packing service may do the same with respect to the second image in comparing the third bounding box to the fourth bounding box generated for the reference item and the item shown in the second image to generate dimensions of the item. Again, the packing service may establish a measurement scale based at least in part on the reference (known) dimensions of the reference item and the third bounding box generated around the reference item in the second image. The packing service may then apply the measurement scale to the fourth bounding box generated around the item shown in the second image to determine dimensions of the item. For example, the packing service may apply the measurement scale to the fourth bounding box generated around the item in the second image to determine a depth of the item.

The packing service may then generate a recommendation for packing the item that identifies a recommended package type to use in packing the item. More specifically, in particular embodiments, the packing service may generate the recommendation based at least in part on the generated dimensions for the item from the first and second images. For example, the packing service may compare the generated dimensions to the dimensions of various package types that are available through a package carrier for shipping items. In some embodiments, the packing service processes the dimensions using a rules-based model to generate the recommendation. For example, the rules-based model may apply a set of rules based at least in part on package dimensions for each package type of a plurality of package types to the dimensions of the item to identify the recommended package type to use in packing the item.

In some embodiments, the packing service may process the prediction of the label for the item in generating the recommendation for packing the item. For example, the prediction of the label may identify the item as fragile or non-fragile. If the label identifies the item as fragile, then the recommendation may identify a recommended filler material to use in packing the item in the recommended package type. Here, the rules-based model may apply a set of rules based at least in part on using different types of filler material with respect to the recommended package type and the dimensions of the item to identify the recommended filler material from the different types of filler material. The different types of filler material may include, for example, cell bubble sheeting, peanuts, crumpled craft paper, foam planks, corrugated board, and/or the like.

The packing service may then communicate the recommendation back to the individual who submitted the request. For example, the packing service may communicate the recommendation via an API installed within a retailer's shipping application or through an interface such as a mobile application downloaded to the individual's user computing device or a website that is visited by the individual via his or her user computing device.

As a result of embodiments of the disclosure only requiring the individual to provide the two images of the reference item and the item and identification of the reference item (and/or dimensions thereof), the complex process that the individual would normally have to go through in identifying an appropriate package type to use in shipping an item, as well as identifying whether and what type of filler material should be used in packing the item into the recommended package type, can be dramatically simplified. This is true even in instances where the individual may use conventional technology that is available to assist him or her in identifying the appropriate package type and/or type of filler material to use.

Embodiments of the disclosure can be even more effective in addressing the technical challenges encountered by an individual who is shipping a combination of items to a destination address. The heightened technical challenge comes from having to identify a package type that can hold the multiple items found in the combination of items. For example, the combination of items may include a first item and a second item. Here, the packing service may request that the individual submit two images for each of the items with the reference item. Therefore, the packing service may receive a request for a recommended package type for the first item and the second item that includes a first image of a top view of the first item and the reference item, a second image of a front view of the first item and the reference item, a third image of a top view of the second item and the reference item, and a fourth image of a front view of the second item and the reference item.

The packing service may process the first, second, third, and fourth images using the at least one machine learning model to generate a first bounding box, a second bounding box, a third bounding box, a fourth bounding box, a fifth bounding box, a sixth bounding box, seventh bounding box, and an eighth bounding box. The machine learning model generates the first bounding box around the reference item and the second bounding box around the first item in the first image. In addition, the machine learning model generates the third bounding box around the reference item and the fourth bounding box around the first item in the second image. In addition, the machine learning model generates the fifth bounding box around the reference item and the sixth bounding box around the second item in the third image. Further, the machine learning model generates the seventh bounding box around the reference item and the eighth bounding box around the second item in the fourth image.

The packing service may then involve comparing the first bounding box to the second bounding box and the third bounding box to the fourth bounding box based at least in part on reference dimensions for the reference item to generate first dimensions of the first item. Likewise, the packing service may involve comparing the fifth bounding box to the sixth bounding box and the seventh bounding box to the eighth bounding box based at least in part on the reference dimensions for the reference item to generate second dimensions of the second item. The packing service may then process both the first dimensions and the second dimensions to generate the recommended package type to use in packing the first item and the second item together. Therefore, by determining the dimensions of each of the first item and the second item separately, the packing service can identify a package type that can be used in shipping both the first item and the second together in a single package to the destination address.

In some embodiments, the packing service may also process the first, second, third, and/or fourth images using the at least one machine learning model to generate predictions of a label for each item. For example, the packing service may process at least one of the first image or the second image using the at least one machine learning model to generate a first prediction of a first label for the first item and process at least one of the third image or the fourth image using the at least one machine learning model to generate a second prediction of a second label for the second item. Accordingly, responsive to at least one of the first prediction identifying the first item as fragile or the second prediction identifying the second item as fragile, the packing service may process the first dimensions, the second dimensions, and/or the recommended package type to generate a recommended filler material to use in packing the first item and the second item in the recommended package type.

The packing service may then communicate the recommendation back to the individual who submitted the request.

For example, the packing service may communicate the recommendation via an API installed within a retailer's shipping application or through an interface such as a mobile application downloaded to the individual's user computing device or a website that is visited by the individual via his or her user computing device.

As a result of embodiments of the disclosure only requiring the individual to provide the two images for each of the items of a combination of items to be shipped to a destination address that have the reference item and the corresponding item, the highly complex process that the individual would normally have to go through in identifying an appropriate package type to use in shipping the combination of items, as well as identifying whether and what type of filler material should be used in packing the items into the recommended package type, can be dramatically simplified. Again, this is true even in instances where the individual may use conventional technology that is available to assist him or her in identifying the appropriate package type and/or type of filler material to use for the combination of items. Further detail is now provided on various aspects of the disclosure.

Example Computing Environment

FIG. 1 depicts an example of a computing environment 100 that can be used for generating and providing recommendations for packing items or combinations of items for shipping in accordance with various embodiments of the present disclosure. In various embodiments, the computing environment 100 includes a packing service computing system 110 that provides a packing service to individuals who submit requests for recommendations on packing items or combinations of items for purposes of shipping the items or combinations of items with a package carrier. For example, the packing service computing system 110 may be associated with a particular package carrier such as UPS, the USPS, and/or the like who are providing the packing service to assist customers in identifying the package types, as well as filler materials, they should use in packing items or combinations of items for shipping with the package carrier.

The packing service computing system 110 may provide the service through different mechanisms. In some embodiments, the packing service computing system 110 may provide an application programming interface ("API") 150 through which calls can be submitted to request recommendations on packing items or combinations of items. For example, one or more client computing systems 180 may integrate computer-implemented functionality for requesting recommendations by installing the API 150 within the client computing system(s) 180 that can then be used to submit calls requesting recommendations over one or more networks 170 (e.g., the Internet). As a specific example, a client computing system 180 for a retailer may be hosting a web application such as a website that has the API 150 installed within the website so that the packing service is available to employees who are responsible for shipping purchases made by customers of the retailer.

Additionally, or alternatively, the packing service computing system 110 may provide an interface 160 through which individuals can submit requests for recommendations on packing items or combinations of items. For example, the interface 160 may be a web application that individuals can access through a web browser on their user computing devices 190, such as personal computers, laptops, tablets, mobile devices, and/or the like, to submit requests for recommendations over one or more networks 170 (e.g., the Internet, cellular network, etc.). In another example, the interface 160 may be a software application, such as a mobile application, that users can install on their user computing devices 190 to submit recommendations.

In particular embodiments, the packing service computing system 110 may execute a pack-wizard module 120 to process the requests received from individuals for recommendations on packing items or combinations of items and provide the recommendations to the individuals. Accordingly, the packing service computing system 110 may include hardware components for executing the pack-wizard module 120. In addition, the packing service computing system 110 may include and/or access one or more machine learning models 130 and/or rules-based models 135 that are used (e.g., by the pack-wizard module 120) in generating the recommendations. Further, in some embodiments, the packing service computing system 110 may include and/or access one or more repositories 140. For example, the packing service computing system 110 may utilize one or more repositories 140 for storing sets of rules that are used by the one or more rules-based models 135.

In addition, the packing service computing system 110 may utilize one or more repositories 140 for storing other types of data used in providing the packing service. For example, the packing service computing system 110 may utilize one or more repositories 140 for storing training and/or testing data used in training the one or more machine learning models 130. Additionally, or alternatively, the packing service computing system 110 may utilize one or more repositories 140 for storing data on the different package types and/or different types of filler material that are available for shipping items. Further detail is now provided regarding the configuration and functionality of the pack-wizard module 120, the one or more machine learning models 130, and the one more rules-based models 135 according to various embodiments of the disclosure.

Pack-Wizard Module

Figure 2:
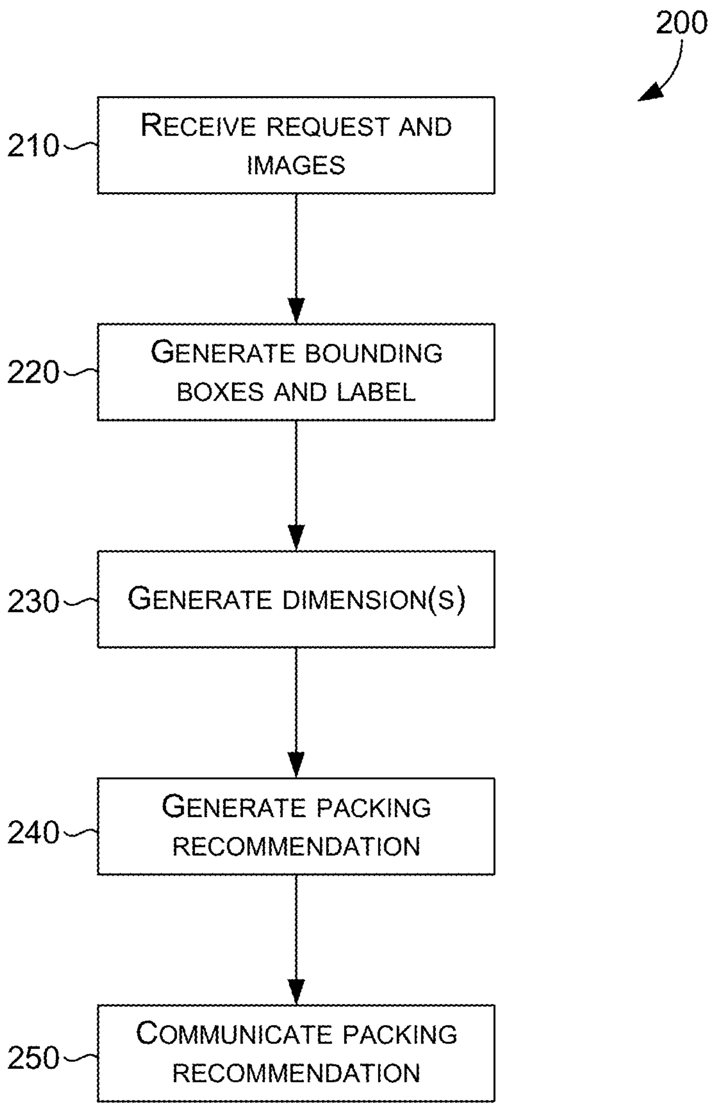
FIG. 2 depicts an example of a process for generating a recommendation for packing one or more items in accordance with various embodiments of the present disclosure.

Turning now to FIG. 2, additional details are provided regarding a pack-wizard module 120 for generating and providing a recommendation for packing an item or combination of items for shipping in accordance with various embodiments of the disclosure. For instance, the flow diagram shown in FIG. 2 may correspond to operations carried out, for example, by computing hardware found in the packing service computing system 110 as described herein, as the computing hardware executes the pack-wizard module 120.

The process 200 involves the pack-wizard module 120 receiving a request for a recommendation on packing an item or combination of items in Operation 210. In particular embodiments, one or more images are included along with the request. For example, the images may include a first image of a top view of the item along with a reference item for each item that is to be shipped.

The reference item is generally an item for which the dimensions of the item are known. For example, the reference item may be a package type that is a stock package type made available by a package carrier that can be used in shipping items with the package carrier and for which the dimensions of the stock package type are known. As a specific example, the reference item may be a 10 kg box provided by a package carrier having dimensions of 16"×13"×10". The request and/or first image may identify the stock package type being used as the reference item in the first image. In another example, the reference item may be an item that is not necessarily a package type, or a stock package type. Here, the request and/or first image may provide the dimensions of the reference item. For example, the request and/or image may provide a height, width, and/or depth of the reference item provided in the first image along with the item.

In addition to the first image, the images may include a second image of a front view of the item and the reference item. Again, the request and/or second image may identify the particular type of reference item (e.g., stock package type) found in the second image, or the request and/or image may identify the dimensions of the reference item (e.g. the height, width, and/or depth) found in the second image.

In other embodiments, a "default" reference item may be used in the first and second images that the pack-wizard module 120 already knows the dimensions of without any input needed to be provided along with the request and/or images. Generally, the first and second images will include the same reference item. However, the first and second images can include different reference items.

As previously noted, various embodiments of the disclosure make use of novel AI in processing the first and second images for each item in generating a recommendation for packing the item or combination of items. In particular embodiments, this novel AI entails the pack-wizard module 120 having the first and second images processed by at least one machine learning model 130 to generate bounding boxes around the item and the reference item shown in the first and second images in Operation 220. More specifically, the pack-wizard module 120 has the first image processed by the at least one machine learning model 130 to generate a first bounding box around the reference item and a second bounding box around the item in the first image. In addition, the pack-wizard module 120 has the second image processed by the at least one machine learning model 130 to generate a third bounding box around the reference item and a fourth bounding box around the item in the second image. Accordingly, for a combination of items, the pack-wizard module 120 has the first and second images processed by the at least one machine learning model 130 for each item found in the combination of items to generate the first, second, third, and fourth bounding boxes.

Additionally, or alternatively, the pack-wizard module 120 may have at least one of the first image or the second image for each item processed by the at least one machine learning model to generate a prediction of a label for the item based at least in part on a texture of the item detected from the first image and/or the second image. In particular embodiments, the at least one machine learning model provides a prediction of a label for the item as fragile (delicate) or non-fragile (non-delicate). Generally speaking, an item that is fragile tends to have a surface texture that is shiny or glossy. For example, a ceramic mug, the exterior of electronic equipment, glassware, and/or the like tend to have surface textures that are shiny or glossy. These items are generally considered "fragile" in that they can be easily damaged during shipping if not packed correctly. Conversely, an item that is non-fragile tends to have a surface texture that is softer or uneven. For example, clothing, a plush toy, pillows, and/or the like tend to have surface textures that are softer or uneven. These items are generally considered "non-fragile" in that they are typically easier to pack without worry of being damaged during shipping.

In Operation 230, the pack-wizard module 120 compares the bounding boxes generated for the first and second images for each item to generate the dimensions of the item. In various embodiments, this operation entails the pack-wizard module 120 comparing the first bounding box to the second bounding box generated for the reference item and the item shown in the first image to generate dimensions for the item. The pack-wizard module 120 does so in particular embodiments based at least in part on the reference dimensions of the reference item.

More specifically, the pack-wizard module 120 performs the comparison in these particular embodiments by establishing a measurement scale based at least in part on the reference dimensions and the first bounding box generated around the reference item shown in the first image. For example, the pack-wizard module 120 may analyze the first bounding box generated around the reference item and establish that a certain number of pixels (e.g., 40 pixels, 30 pixels, etc.) in the image is equal to a certain measurement (1 inch, 1 cm, etc.) based at least in part on the reference (known) dimensions of the reference item and the first bounding box generated around the reference item in the first image. The pack-wizard module 120 may then apply the measurement scale to the second bounding box generated around the item shown in the first image to determine the dimensions of the item. For example, the pack-wizard module 120 may apply the measurement scale to the second bounding box generated around the item in the first image to determine a height and width of the item.

The pack-wizard module 120 performs the same operation with respect to the second image in comparing the third bounding box to the fourth bounding box generated for the reference item and the item shown in the second image to generate dimensions of the item. Again, the pack-wizard module 120 may establish a measurement scale based at least in part on the reference (known) dimensions of the reference item and the third bounding box generated around the reference item in the second image. The pack-wizard module 120 may then apply the measurement scale to the fourth bounding box generated around the item shown in the second image to determine dimensions of the item. For example, the pack-wizard module 120 may apply the measurement scale to the fourth bounding box generated around the item in the second image to determine a depth of the item. Accordingly, the pack-wizard module 120 performs the same operation for each item found in a combination of items to generate the dimensions of each item.

In Operation 240, the pack-wizard module 120 generates a recommendation for packing the item or combination of items that identifies a recommended package type to use in packing the item or combination of items. In some instances, the pack-wizard module 120 may generate a recommendation that identifies more than one package type for a request involving a combination of items.

A package type can generally be understood as a specific type of package having certain properties. For example, a package type may involve a package having a certain size such as dimensions of 16"×13"×10", dimensions of 19"×17"×14", dimensions of 18"×13"×3", and/or the like. In addition, a package type may involve a package having a certain construction such as a letter, a box, a tube, a pallet box, and/or the like. In addition, a package type may involve a package that is designed to be used for a certain purpose such as documents, small items such as clothing, shoes, or medium electronics, items such as charts, maps, blueprints, and/or the like. Further, a package type may involve a package that is constructed of certain material such as cardboard, tear-resistant material, paper, and/or the like.

In particular embodiments, the pack-wizard module 120 generates the recommendation based at least in part on the generated dimensions for each item from the first and second images. For example, the pack-wizard module 120 may compare the generated dimensions to the dimensions of various package types that are available through a package carrier for shipping items. In some embodiments, the pack-wizard module 120 processes the dimensions using a rules-based model 135 to generate the recommendation. For example, the rules-based model 135 may apply a set of rules based at least in part on package dimensions for each package type of a plurality of package types to the dimensions of the item or combination of items to identify the recommended package type to use in packing the item or combination of items.

Additionally, or alternatively, the pack-wizard module 120 processes the prediction of the label for the item in generating the recommendation for packing the item. For example, if the label identifies any of the items as fragile (delicate), then the pack-wizard module 120 may also consider certain properties of the package types that are available such as their construction and constructed material in generating the recommendation for packing the item or combination of items. In addition, the pack-wizard module 120 may generate a recommendation that identifies a recommended filler material to use in packing the item or combination of items in the recommended package type. The different types of filler material may include, for example, cell bubble sheeting, peanuts, crumpled craft paper, foam planks, corrugated board, and/or the like.

Accordingly, the pack-wizard module 120 may utilize the same or a different rules-based model 135 that applies a set of rules that is relevant to the predicted label for each item. For example, the rules-based model 135 may apply a set of rules based at least in part on various properties of the package types such as their construction (e.g., letter, box, tube, etc.), constructed material (e.g., cardboard, tear-resistant material, paper, etc.), and/or the like to identify the recommended package type from the different package types that are available. In addition, the rules-based model 135 may apply a set of rules based at least in part on using different types of filler material with respect to the recommended package type and the dimensions to identify the recommended filler material from the different types of filler material that are available.

In some embodiments, a description of each item may be included along with the request. The rules-based model 135 may apply a set of rules that is based at least in part on the description in generating the recommendation for the package type and/or the filler material. For example, the description may identify that an item that is to be packed is a dinnerware bowl. The rules-based model 135 may apply a set of rules that includes a rule that indicates dinnerware should be packed using foam bubble wrap to help ensure the dinnerware is not damaged during shipping.

In addition, the pack-wizard module 120 may provide an estimated cost for shipping the item or combination of items. For example, the pack-wizard module 120 may generate a dimensional weight for the item or combination of items based at least in part on the dimensions determined for each item. The pack-wizard module 120 may generate the dimensional weight of an item by generating a cubic size for the item by multiplying the height, width, and depth of the item, and then dividing the cubic size by a dimensional divisor. The pack-wizard module 120 may then generate a cost of shipping the item or combination of items based at least in part on the dimensional weight generated for each item. In some embodiments, the pack-wizard module 120 may also consider the description of each item, if provided, in generating the dimensional weight and corresponding cost.

In Operation 250, the pack-wizard module 120 communicates the packing recommendation to the individual who submitted the request. For example, the pack-wizard module 120 may communicate the recommendation via an API installed within a retailer's shipping application provided through a client computing system 180 or through an interface such as a mobile application downloaded to the individual's user computing device 190 or a website that is visited by the individual via his or her user computing device 190.

Example Machine Learning Models

Various embodiments of the disclosure make use of novel AI in processing the first and second images for each item in generating a recommendation for packing the item or combination of items. In particular embodiments, the AI involves one or more machine learning models 130 that are trained to analyze the first and second images provided for each item and recognize the reference item and item in the images. For example, the machine learning model may be a deep learning model such as a convolutional neural network that has been trained on training images of items and reference items that have been labeled accordingly.

The machine learning model 130 may be trained using training images in which the items and reference items have been outlined with a bounding box and labeled as fragile (delicate), non-fragile (non-delicate), or reference item. To train the machine learning model 130 more effectively, the training images may involve images that vary visually by camera angle, lighting, background, visual style, size, type, and/or the like.

During training, certain parameters may be calculated in evaluating the accuracy at which the machine learning model 130 is able to recognize and correctly label items and reference items within the testing images. For example, precision, recall, and/or mean average precision may be calculated. Precision indicates the fraction of identified fragile items, non-fragile items, and reference items (e.g., classifications) that were correct. For example, if the machine learning model 130 identified one hundred images as containing fragile items, and ninety-nine of the images actually contain fragile items, then the precision is ninety-nine percent. Recall indicates the fraction of fragile items, non-fragile items, and reference items (e.g., classifications) that were correctly identified. For example, if one hundred of the images contain non-fragile items, and the machine learning model 130 identifies ninety-five of the images as containing non-fragile items, then the recall is ninety-five percent. Mean average precision is the average value of the average precision. Average precision is the area under the precision/recall curve (precision plotted against recall for each prediction made).

In addition, one or more thresholds may be set for training the machine learning model 130. For example, a probability threshold may be set to establish a level of confidence that the machine learning model 130 needs to have in a prediction to be considered correct for purposes of calculating precision and recall. Generally, a high probability threshold will lead to a machine learning model 130 that tends to return results with high precision, but at the expense of recall. A low probability threshold does the opposite. Therefore, the probability threshold may be adjusted during training to balance the machine learning model's 130 precision and recall to satisfactory levels.

Additionally, or alternatively, an overlap threshold may be set to establish how correct an item prediction must be to be considered "correct" in training. The overlap threshold sets the minimum allowed overlap between the machine learning model's 130 predicted bounding box for an item and the actual bounding box placed around the item in the image. The predicted bounding box and actual bounding box must overlap to the overlap threshold (e.g., degree) to be considered correct. Similar to the probability threshold, the overlap threshold may be adjusted during training to train the machine learning model's 130 generation (e.g., prediction) of bounding boxes around items and reference items to a satisfactory level. Accordingly, the machine learning model 130 is trained on the training images to create various iterations of the model until the model 130 can recognize items and reference items within testing images (e.g., with a corresponding bounding box) and predict their labels correctly to a satisfactory level (e.g., threshold level) of precision, recall, and accuracy.

Example Interface

Figure 3:
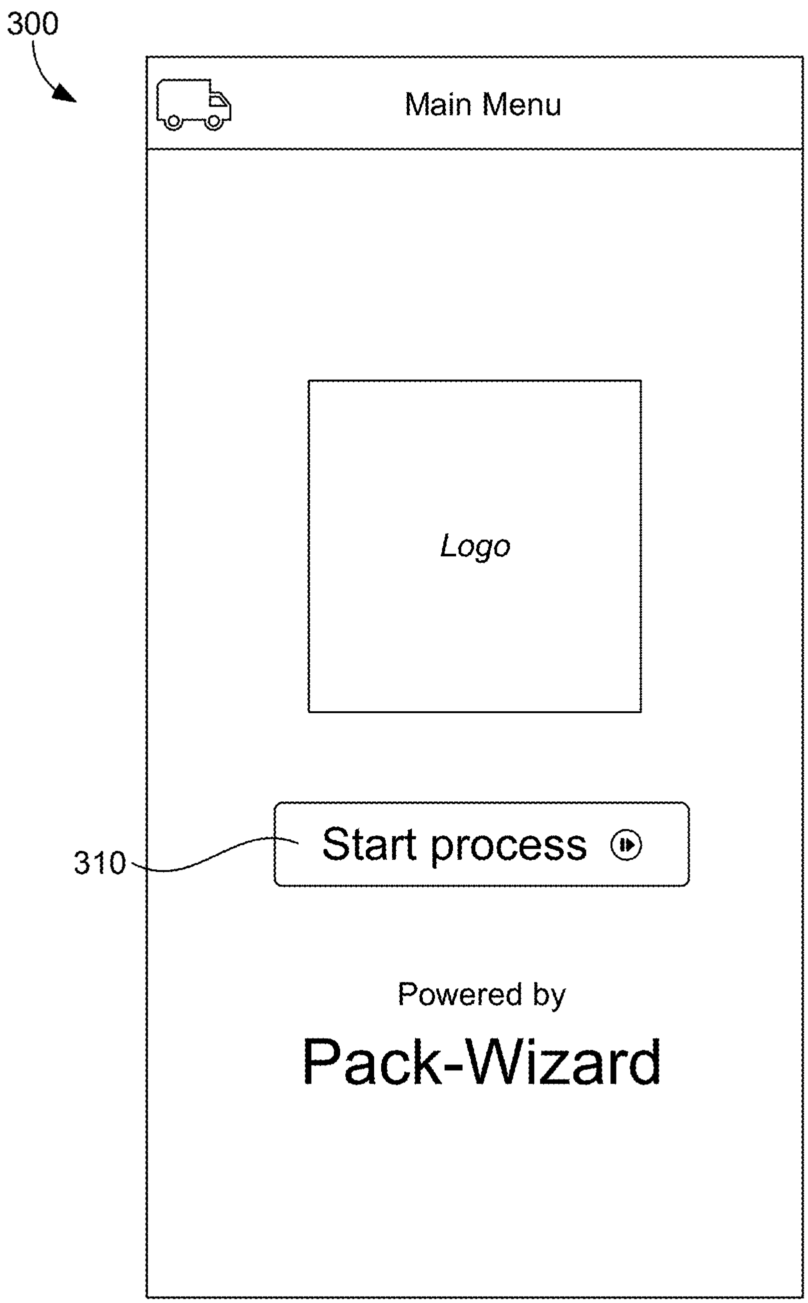
FIGS. 3-8 depict screens of an example interface providing functionality in accordance with various embodiments of the present disclosure.
Figure 4:
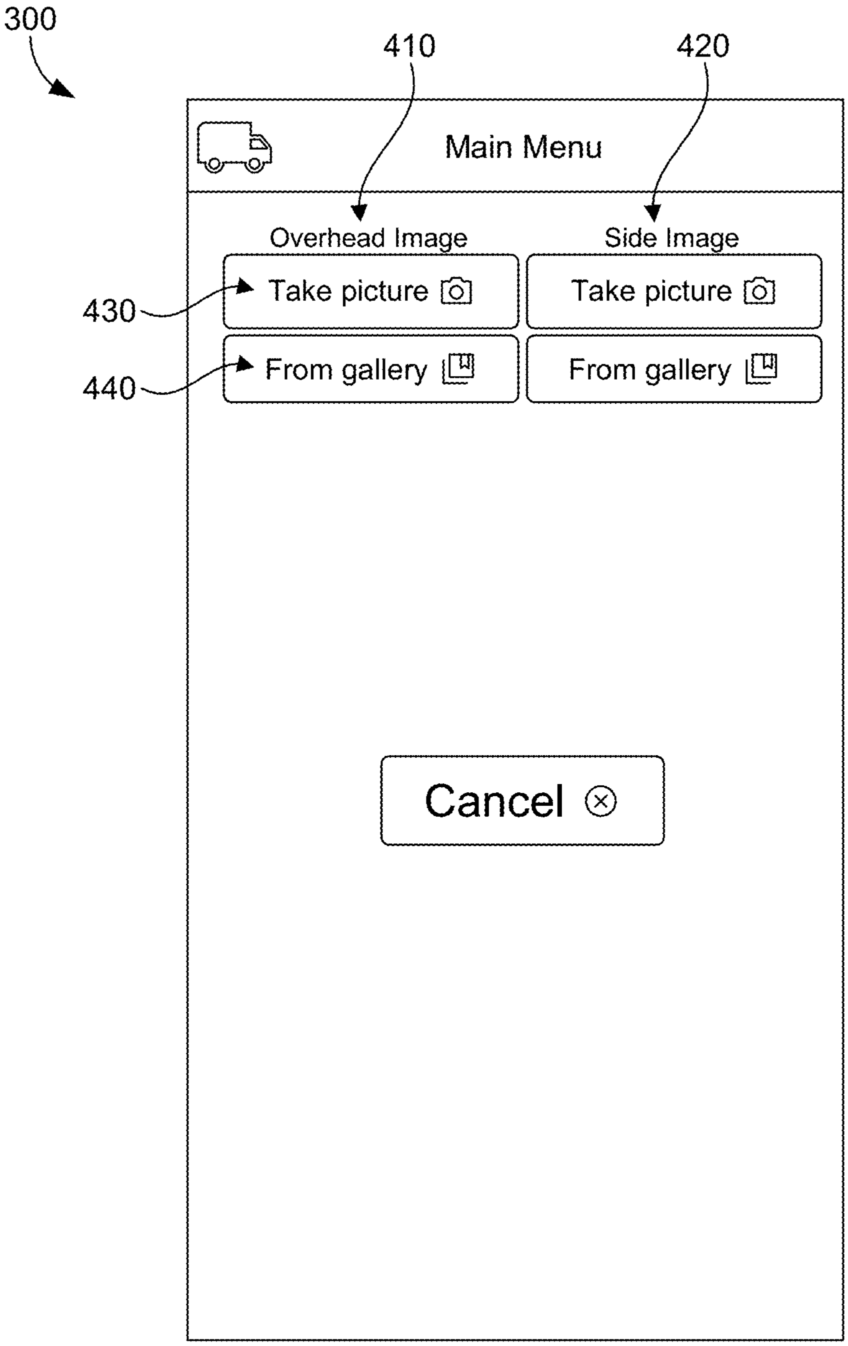

FIGS. 3-8 depict screens of an example interface providing functionality in accordance with various embodiments of the present disclosure. For example, the interface may be a software application (e.g., mobile application) that has been installed on an individual's user computing device 190 (e.g., mobile device) and used to access the packing service. FIG. 3 depicts a main menu screen 300 for the packing service in which the individual may select a button 310 to start a process for requesting a recommendation for packing an item or combination of items. FIG. 4 depicts the main menu screen 300 having various options for the individual to upload the first (overhead) image 410 and the second (side) image 420 of a reference item and an item. The individual can choose to take a picture 430 of the reference item and the item using a camera available through the individual's user computing device 190 to generate the first and second images 410, 420. Alternatively, the individual can choose to select images of the reference item and the item from an image gallery 440 that is available on the individual's user computing device 190.

Figure 5:
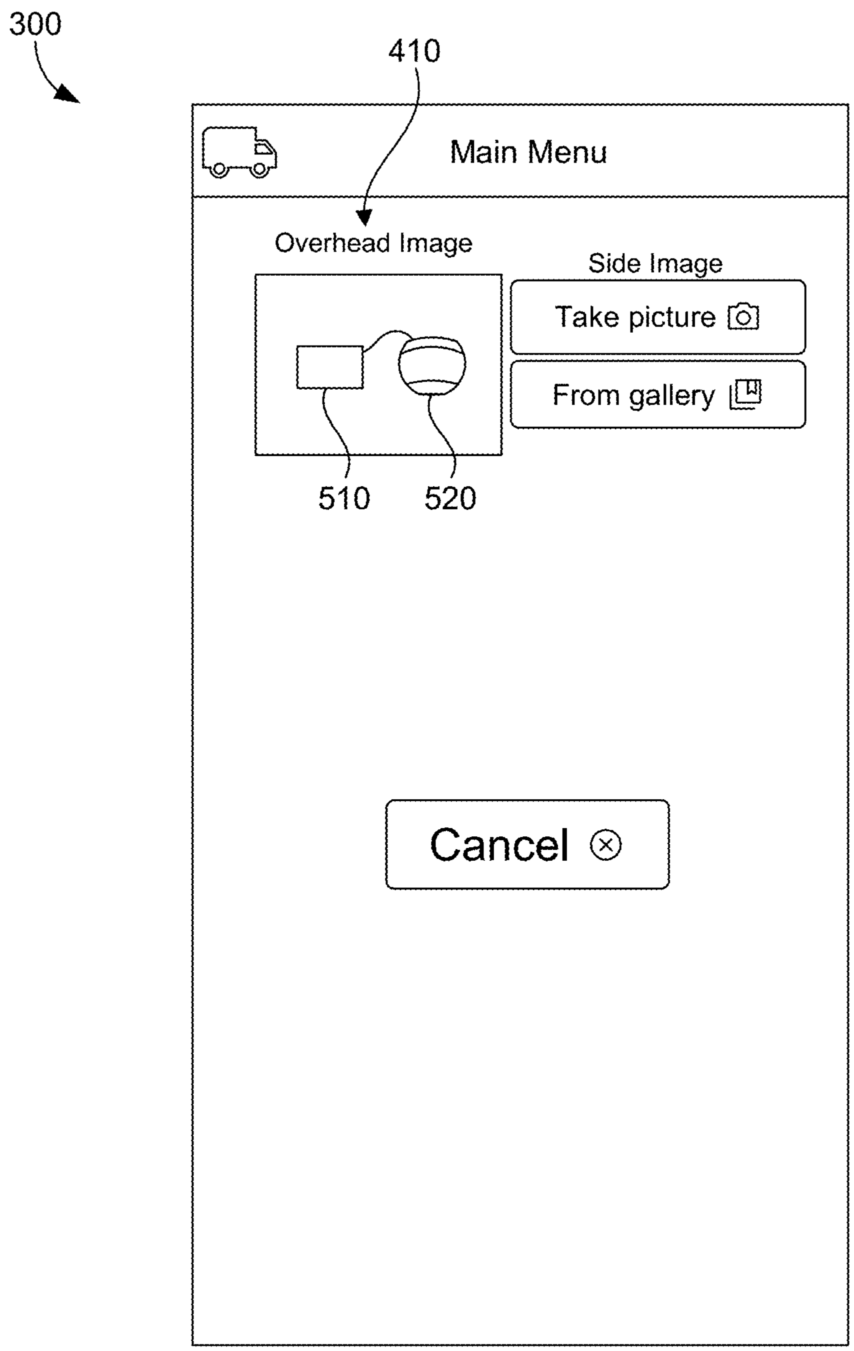
Figure 6:
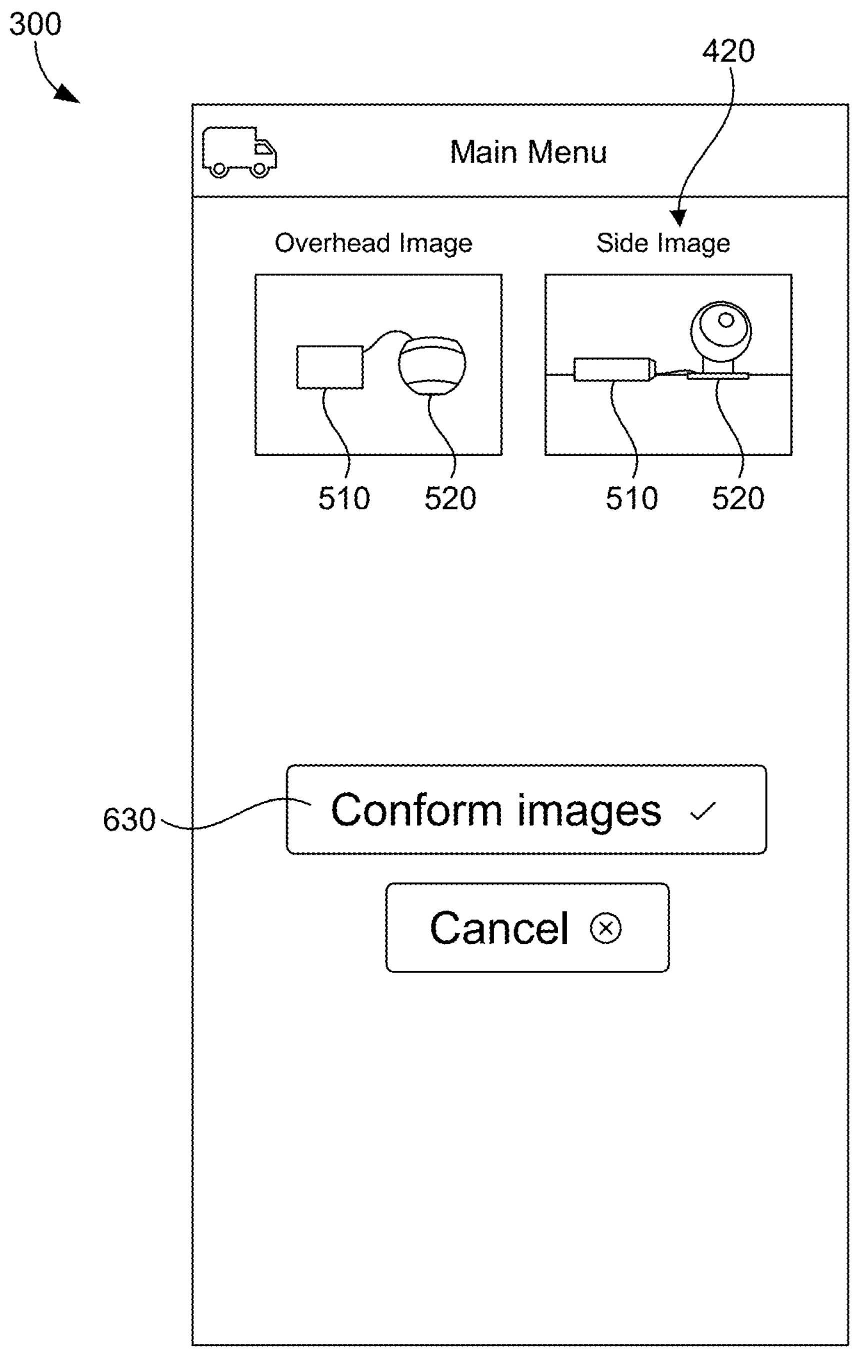

FIG. 5 depicts the main menu screen 300 with the first image 410 uploaded. The first image 410 provides an overhead view of the reference item 510 and the item 520. In this example, the reference item 510 is a shipping box that may be available through a package carrier and the item 520 is a desk fan. FIG. 6 depicts the main menu screen 300 with the second image 420 also uploaded. The second image 420 provides a side view of the reference item 510 and the item 520. Once the individual has uploaded the first and second images 410, 420, the individual can select a button 630 to confirm the images 410, 420 have been uploaded.

Figure 7:
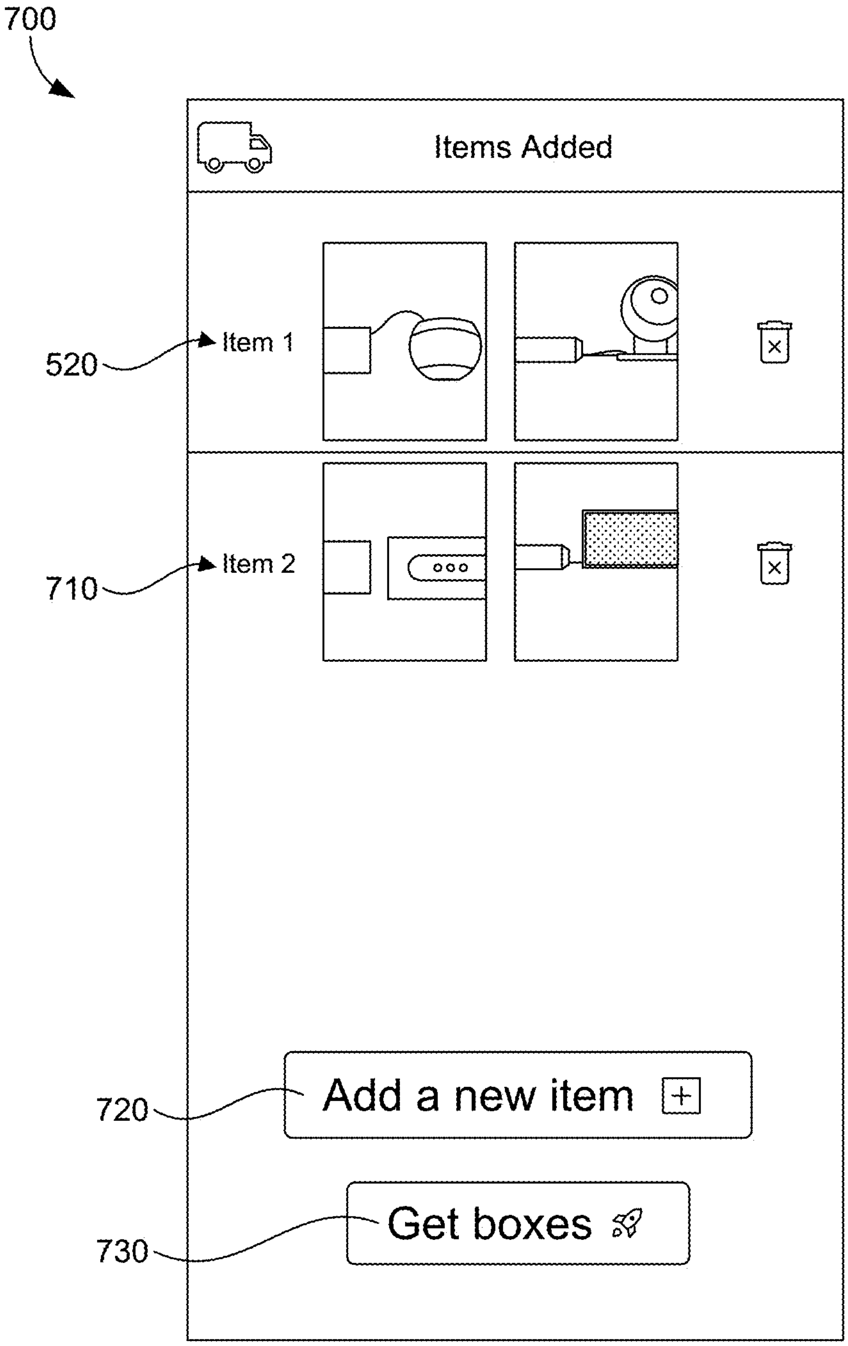

If the individual would like a recommendation for a combination of items, then the individual repeats the steps of uploading the first and second images 410, 420 for each item in the combination of items. FIG. 7 depicts an example in which the individual would like a recommendation for a combination of items with an items added screen 700 displaying the first and second images 410, 420 for a first item 520 and the first and second images 410, 420 for a second item 710. The items added screen 700 provides the individual with a button 720 to add more items to the combination of items if desired.

Figure 8:
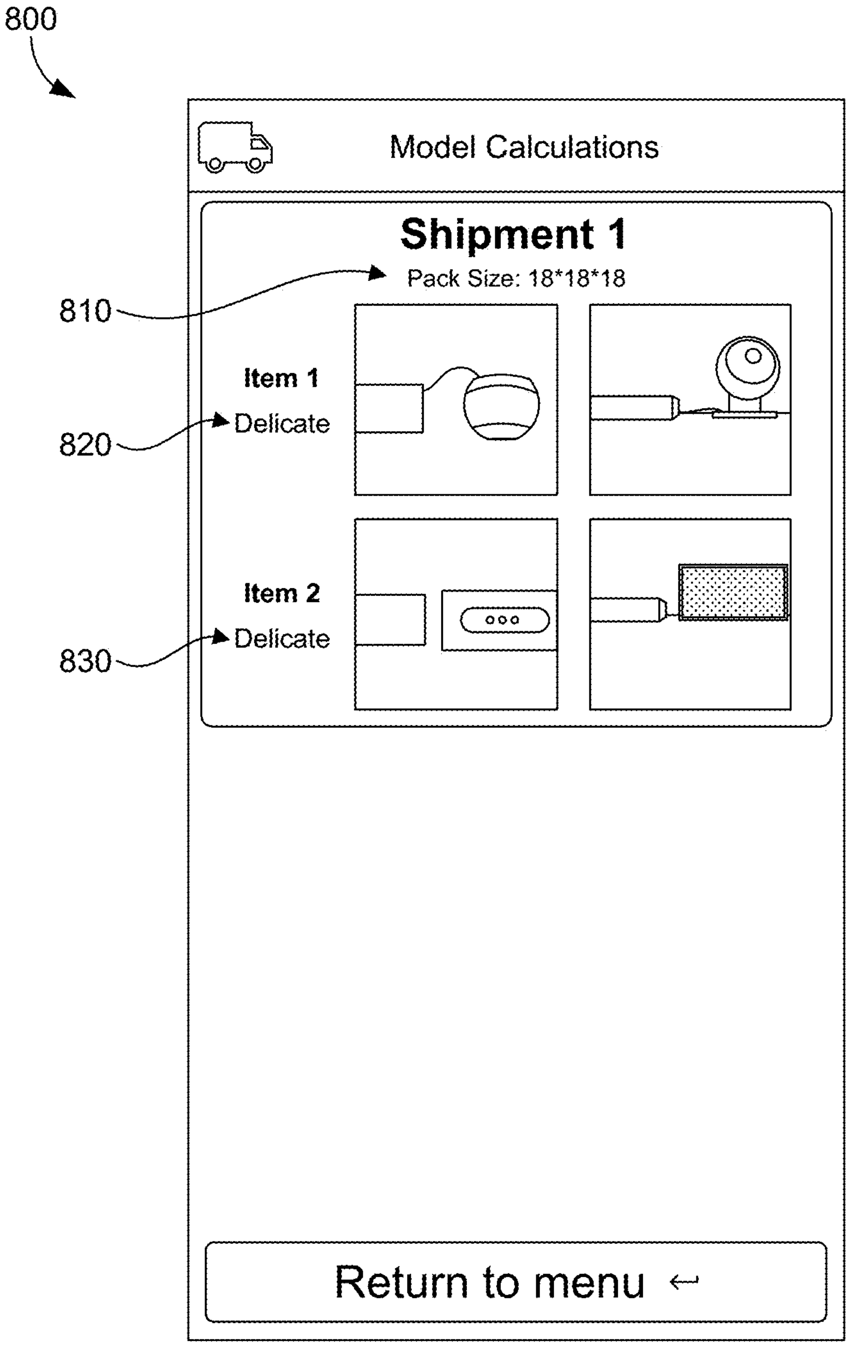

Once the individual has uploaded the first and second images 410, 420 for each item 520, 710 in the combination of items, then the individual can select a button 730 to generate the request for the recommendation from the packing service. In turn, the packing service receives the request and generates the recommendation via functionality as described herein. FIG. 8 depicts an example of a model calculations screen 800 that provides the individual with the recommendation for packing the two items 520, 710. Here, the packing service has generated a recommendation that involves packing both items 520, 710 into a single shipment using a package type of a box having dimensions of 18"×18"×18" 810. In addition, the recommendation indicates that the two items 520, 710 are considered delicate 820, 830. The individual may take this additional information into consideration when packing the two items into the box to use extra care to ensure that they are not damaged during shipping. In some instances, the packing service may have included a recommendation on a type of filler material that the individual may want to use in packing the two items 520, 710 into the box.

Accordingly, the individual can access the packing service through the interface to submit requests for recommendations on packing items or combinations of items. In the example, the interface only required the individual to upload two images 410, 420 for each item 520, 710 that is to be shipped along with a reference item 510 and the packing service was able to generate the recommendation only using this limited information as described herein. As a result, embodiments of the disclosure can dramatically simplify the complex process that the individual would normally have to go through in identifying an appropriate package type to use in shipping an item or combination of items, as well as identifying whether and what type of filler material should be used in packing the item or combination of items into the recommended package type.

Example Technical Platforms

Embodiments of the disclosure may utilize various components such as computing systems and/or devices, storage devices, and/or the like, in performing various operations. Accordingly, these components involved in embodiments of the present disclosure may perform instructions that are implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media). However, the computer-readable storage medium may not be a transitory medium.

In some embodiments, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various embodiments are described to use a computer-readable storage medium, other types of computer-readable storage media may be substituted for or used in addition to the computer-readable storage media described above.

Various embodiments of the present disclosure, and/or components thereof and/or that are utilized, may also be implemented as methods, apparatuses, systems, computing devices, computing entities, and/or the like. As such, various embodiments of the present disclosure, and/or components thereof and/or that are utilized, may take the form of a data structure, apparatus, system, computing device, computing entity, and/or the like executing instructions stored on a computer-readable storage medium to perform certain steps or operations. Thus, various embodiments of the present disclosure, and/or components thereof and/or that are utilized, also may take the form of entirely hardware, entirely computer program product, and/or a combination of computer program product and hardware performing certain steps or operations.

Various embodiments of the present disclosure, and/or components thereof and/or that are utilized, are described herein with reference to block diagrams and flowchart illustrations. Thus, each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of embodiments, retrieval, loading, and/or execution may be performed in parallel such that multiple instructions are retrieved, loaded, and/or executed together. Thus, such embodiments can produce specially configured machines performing the steps or operations specified in the block diagrams and flowchart illustrations. Accordingly, the block diagrams and flowchart illustrations support various combinations of embodiments for performing the specified instructions, operations, or steps.

Example System Architecture

Figure 9:
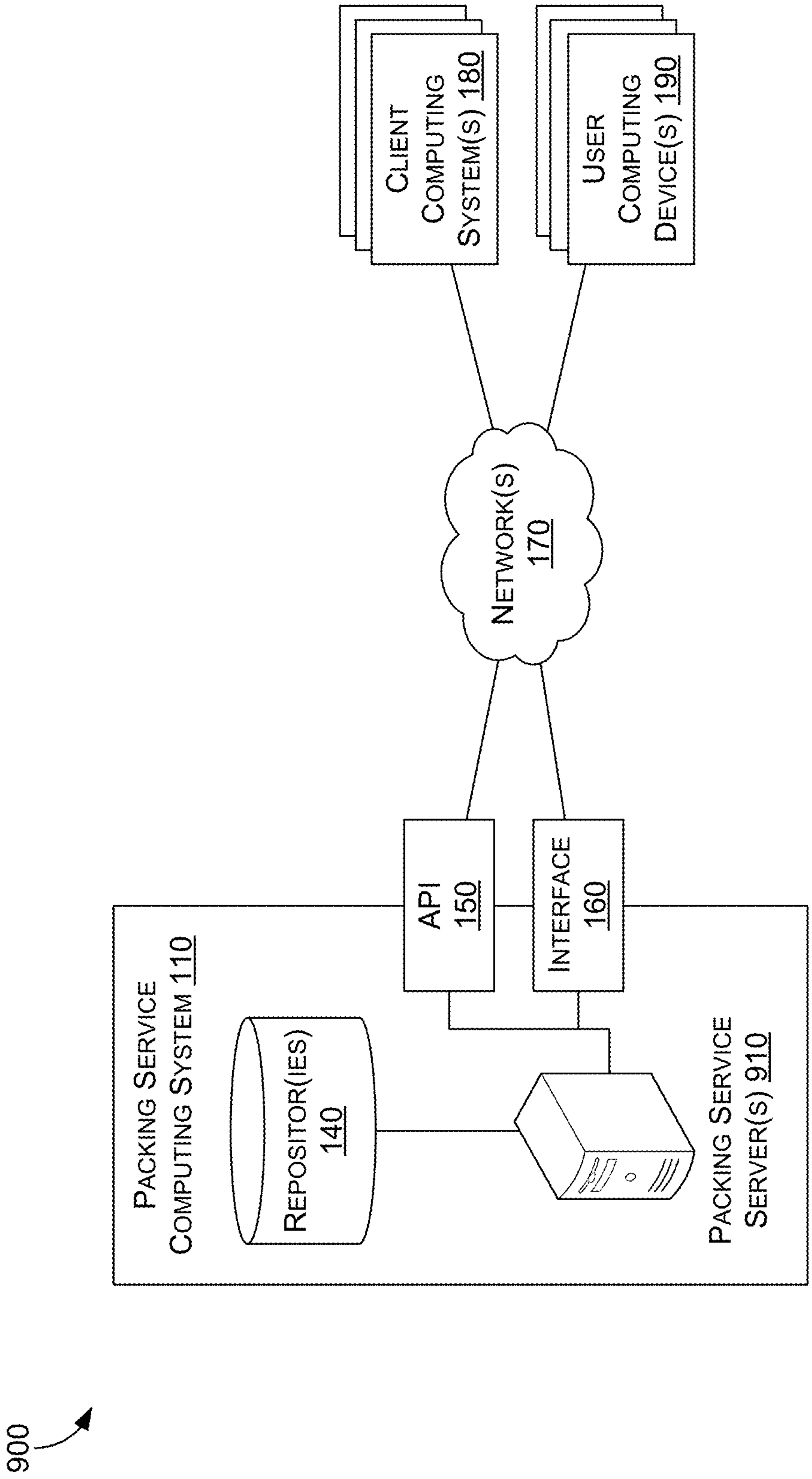
FIG. 9 depicts an example of a computing architecture that may be used in accordance with various embodiments of the present disclosure.

FIG. 9 is a block diagram of a system architecture 900 that can be used in generating and providing recommendations for packing items or combinations of items according to various embodiments of the disclosure as detailed herein. Components of the system architecture 900 are configured according to various embodiments to provide functionality configured to generate and provide the recommendations through a packing service. As may be understood from FIG. 9, the system architecture 900 in various embodiments may include a packing service computing system 110 that comprises one or more packing service servers 910 and one or more data repositories 140 to facilitate such functionality.

In particular embodiments, the one or more packing service servers 910 and repositories 140 are used as processing capacity and storage in supporting the packing service. For example, the one or more packing service servers 910 may execute a pack-wizard module 120 as described herein in providing functionality for the packing service. In addition, the one or more data repositories 140 may be used for storing programs, data, and/or the like used in supporting the packing service. For example, the one or more data repositories 140 may be used for storing one or more machine learning models 130, rules-based models 135, sets of rules, etc. Further, the one or more data repositories 140 may be used for storing data on different package types and/or filler material types.

The one or more packing service servers 910 may be in communication with one or more client computing systems 180, as well as one or more user computing devices 190, over one or more networks 170 (e.g., the Internet, cellular, intranet, and/or the like). Accordingly, the packing service server(s) 910 may be in communication over the network(s) 170 with components residing on the client computing systems 180 and/or with the user computing devices 190 to facilitate various functionality as described herein. To do so, the packing service server(s) 910 may interface with the client computing systems 180 via one or more suitable application programming interfaces (APIs) 150, direct connections, and/or the like. In addition, the packing service server(s) 910 may interface with the user computing devices 190 via an interface 160 such as, for example, a Web application, mobile application, and/or the like. Although the packing service server(s) 910 and data repository(ies) 140 for the packing service computing system 110 are shown as separate components, it should be understood that according to other embodiments, these components 910, 140 may comprise a single server and/or repository, a plurality of servers and/or repositories, or any other suitable configuration.

Example Computing Hardware

Figure 10:
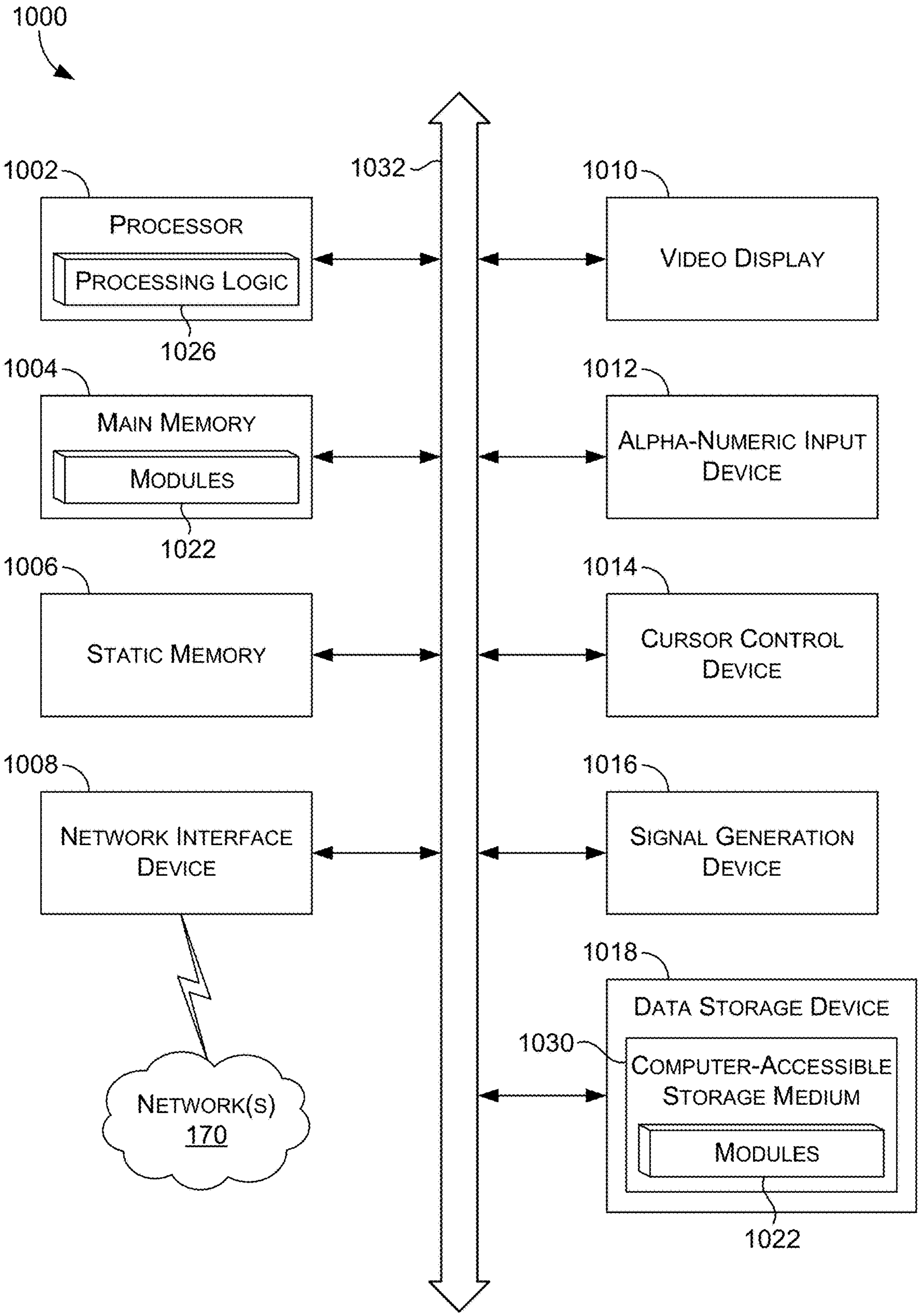
FIG. 10 depicts an example of computing hardware suitable for supporting the operation of various embodiments of the present disclosure.

FIG. 10 illustrates a diagrammatic representation of an example of computing hardware 100 that can be used within the system architecture 900. For example, the computing hardware 1000 may be a server 910 as described in FIG. 9. In various embodiments, the computing hardware 1000 may be connected (e.g., networked) to other computing hardware via a wireless network, a LAN, an intranet, an extranet, and/or the Internet. The computing hardware 1000 may operate in the capacity of a server, a client computer in a client-server network environment, a peer computer in a peer-to-peer (or distributed) network environment, and/or the like. The computing hardware 1000 may be, for example, a desktop personal computer (PC), a tablet PC, a set-top box (STB), a Personal Digital Assistant (PDA), a cellular telephone, a web appliance, a server, a network router, a switch or bridge, or any other computing hardware capable of executing a set of instructions (sequential or otherwise) that specify actions to be taken by the computing hardware 1000. Further, while the computing hardware 1000 is shown as a single computing entity in FIG. 10, the term "computing hardware" shall also be taken to include any collection of computing entities that individually or jointly execute a set (or multiple sets) of instructions to perform any one or more of the methodologies/functionalities described herein.

The computing hardware 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1032.

The processing device 1002 represents one or more general-purpose processing devices such as a microprocessor, a central processing unit, and/or the like. More particularly, the processing device 1002 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 may be configured to execute processing logic 1026 for performing various operations, steps, and/or the like as discussed herein.

The computing hardware 1000 may further include a network interface device 1008. The computing hardware 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a non-transitory computer-accessible storage medium 1030 (also known as a non-transitory computer-readable storage medium or a non-transitory computer-readable medium) on which is stored one or more modules 1022 (e.g., sets of instructions) as described herein. The modules 1022 may also reside, completely or at least partially, within the main memory 1004 and/or within the processing device 1002 during execution thereof by the computing hardware 100). In this capacity, the main memory 1004 and the processing device 1002 can also constitute computer-accessible storage media. The modules 1022 may further be transmitted or received over one or more networks 170 via a network interface device 1008.

While the computer-accessible storage medium 1030 is shown in FIG. 10 to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a module (e.g., a set of instructions) for execution by the computing hardware 1000 and that cause the computing hardware 1000 to perform any one or more of the methodologies/functionalities of the present disclosure. The term "computer-accessible storage medium" should accordingly be understood to include, but not be limited to, solid-state memories, optical and magnetic media, etc.

Example User Computing Device

Figure 11:
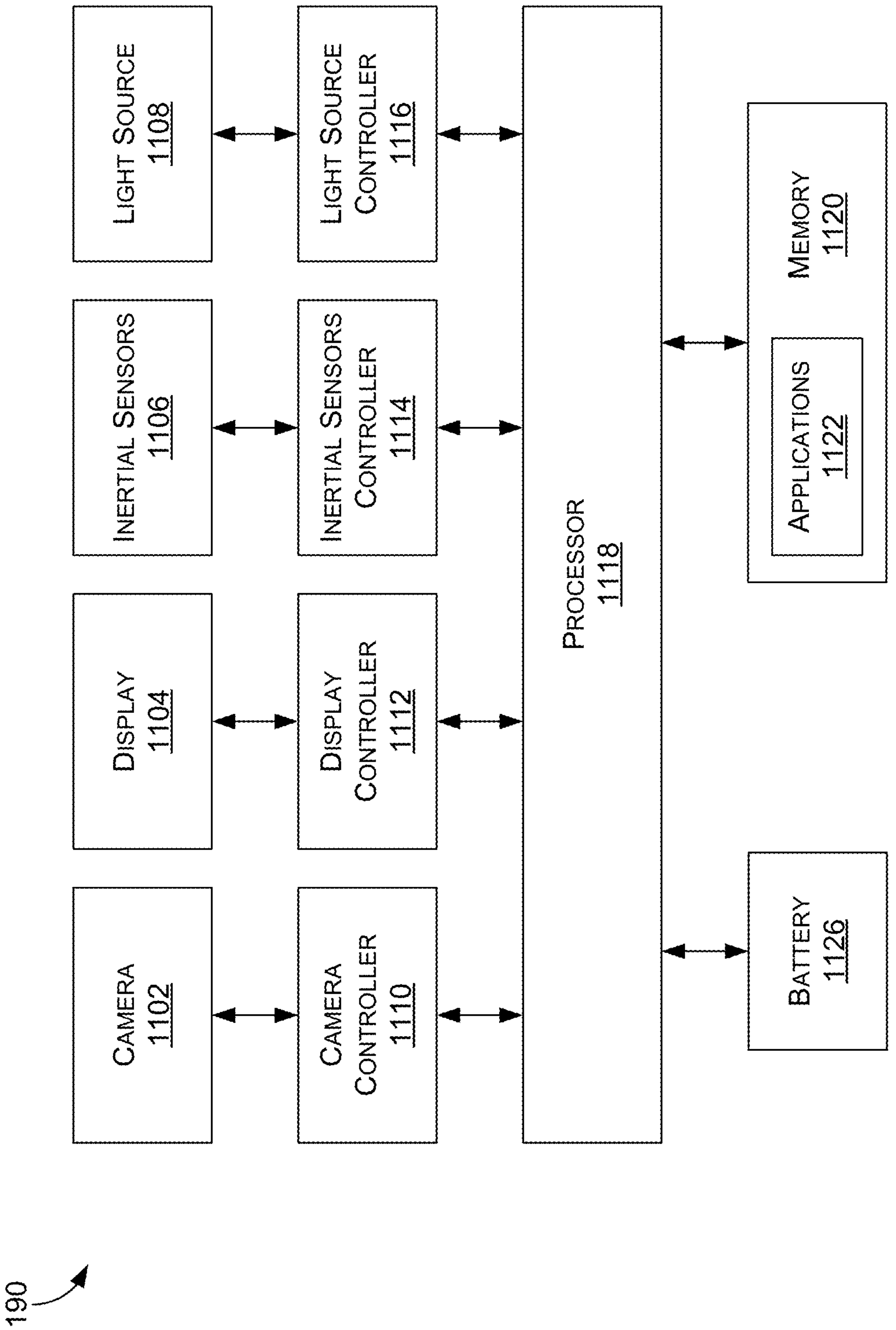
FIG. 11 depicts an example of a user computing device for supporting the operation of various embodiments of the present disclosure.

FIG. 11 illustrates a diagrammatic representation of an example of a user computing device 190 that can be used within the system architecture 900. For example, the user computing device 190 may be an individual's personal mobile device such as a smartphone, tablet, and/or the like. In addition, the user computing device 190 may include components such as a camera 1102, a display 1104, one or more inertial sensors 1106, and a light source 1108.

The camera 1102 may include an imaging sensor which may be any suitable type of sensor. In addition, the camera 1102 may include a front-facing and/or a rear-facing camera. The light source 1108 may be any suitable source of light, such as, for example, one or more light-emitting diodes (LED). The light source 1108 may be controlled to be selectively switched on or off. The inertial sensors 1106 may include an accelerometer that tracks relative motion of the user computing device 190, a gyroscope that tracks relative motion of the user computing device 190 during a period of time, a compass, an orientation sensor, and/or any other types of sensors that provide an output indicating of a position, orientation, or motion of the user computing device 190. The user computing device 190 may also include proximity sensors and other types of sensors.

The display 1104 may be any suitable type of display adapted to display images captured by the user computing device 190, as well as display screens of various applications 1122 installed on the user computing device 190 to a user of the device 190. For example, the display 1104 may be an LED-backlit type of display. In addition, the display 1104 may be a touch screen displaying various icons and other controls that a user can touch or manipulate in any other manner (e.g., using gestures). The display 1104 may include buttons and other components that are adapted to receive user input in controlling aspects of the user computing device 190 such as, for example, the camera 1102.

Operation of each of the camera 1102, the display 1104, the inertial sensors 1106, and the light source 1108 may be controlled via one or more controllers, such as a camera controller 1110, a display controller 1112, a motion controller 1114, and a light source controller 1116. These controllers 1110, 1112, 1114, 1116 may be implemented using circuitry or other suitable components as are known in the art and are adapted to transmit control signals to their respective components 1102, 1104, 1106, 1108. In some embodiments, the user computing device 190 may comprise other controllers such as, for example, a video controller, an audio controller, and/or the like. The controllers may receive commands from a processor 1118 and provide control signals, which implement the commands, to their respective components 1102, 1104, 1106, 1108.

The user computing device 190 may include memory 1120 coupled to the processor 1118. The memory 1120 may be encoded with computer-executable instructions. In addition, the memory 1120 may be implemented as at least one computer-readable storage medium that may retain information for a sufficient time to provide the computer-executable instructions in a non-transitory form. The computer-executable instructions may be in many forms, such as applications, or program modules and the processor 1118 may comprise circuitry for executing the computer-executable instructions. As such, the memory 1120 may store one or more applications 1122 for controlling the user computing device 190 and providing functionality as described herein. For example, the applications 1122 may include an application for accessing the packing service as described herein. The memory 1120 may represent one or more types of memory, which may be implemented using multiple types of memory components. In addition, the memory 1120 may store an operating system executed by the processor 1118. Further, the user computing device 190 may comprise a battery 1126, in addition to other components not shown in FIG. 11, such as wireless communication circuits, input/output components, and any other type of components.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

Embodiment 1: A method comprising: receiving, by computing hardware and from a user computing device, a request for a recommendation for packing an item, a first image of a top view of the item and a reference item, and a second image of a front view of the item and the reference item, wherein the request identifies reference dimensions for the reference item; processing, by the computing hardware, the first image and the second image using at least one machine learning model to: generate a first bounding box around the reference item and a second bounding box around the item in the first image, generate a third bounding box around the reference item and a fourth bounding box around the item in the second image, and generate a prediction of a label for the item based at least in part on a texture of the item detected from at least one of the first image or the second image; comparing, by the computing hardware and based at least in part on the reference dimensions, the first bounding box to the second bounding box and the third bounding box to the fourth bounding box to generate dimensions of the item; processing, by the computing hardware using a rules-based model, the prediction of the label for the item and the dimensions to generate the recommendation for packing the item, wherein the recommendation identifies a recommended package type to use in packing the item; and communicating, by the computing hardware, the recommendation to the user computing device.

Embodiment 2: The method of embodiment 1, wherein the dimensions comprise a width, a height, and a depth of the item, comparing the first bounding box to the second bounding box involves deriving the width and the height of the item, and comparing the third bounding box to the second bounding box involves deriving the depth of the item.

Embodiment 3: The method of any of embodiments 1 or 2, wherein the rules-based model applies a set of rules based at least in part on package dimensions for each package type of a plurality of package types to the dimensions of the item to identify the recommended package type to use in packing the item.

Embodiment 4: The method of any of embodiments 1 to 3, wherein the prediction of the label identifies the item as fragile or non-fragile.

Embodiment 5: The method of any of embodiments 1 to 4, wherein the prediction of the label identifies the item as fragile, and the recommendation identifies a recommended filler material to use in packing the item in the recommended package type.

Embodiment 6: The method of embodiment 5, wherein the rules-based model applies a set of rules based at least in part on using different types of filler material with respect to the recommended package type and the dimensions to identify the recommended filler material from the different types of filler material.

Embodiment 7: The method of any of embodiments 1 to 6, wherein the request comprises a description of the item, the recommendation comprises an estimated cost for shipping the item, and the method further comprises: generating, by the computing hardware and based at least in part on the description and the dimensions, an estimated weight of the item; and generating, by the computing hardware and based at least in part on the estimated weight, the estimated cost.

Embodiment 8: A system comprising: a non-transitory computer-readable medium storing instructions; and a processing device communicatively coupled to the non-transitory computer-readable medium, wherein the processing device is configured to execute the instructions and thereby perform operations comprising: receiving, from a user computing device, a request for a recommended package type for an item, a first image of a top view of the item and a reference item, and a second image of a front view of the item and the reference item, wherein the request identifies reference dimensions for the reference item; receiving identification of a first bounding box, a second bounding box, a third bounding box, a fourth bounding box, wherein at least one machine learning model processes the first image and the second image to: generate the first bounding box around the reference item and the second bounding box around the item in the first image, and generate the third bounding box around the reference item and the fourth bounding box around the item in the second image; comparing, based at least in part on the reference dimensions, the first bounding box to the second bounding box and the third bounding box to the fourth bounding box to generate dimensions of the item; processing, using a rules-based model, the dimensions to generate the recommended package type to use in packing the item; and communicating the recommended package type to the user computing device.

Embodiment 9: The system of embodiment 8, wherein the operations further comprise: receiving identification of a prediction of a label for the item, wherein the at least one machine learning model processes at least one of the first image or the second image to generate the prediction of the label for the item; responsive to the prediction of the label identifying the item as fragile, processing, using the rules-based model, the dimensions and the recommended package type to generate a recommended filler material to use in packing the item in the recommended package type; and communicating the recommended filler material to the user computing device.

Embodiment 10: The system of embodiment 9, wherein the rules-based model applies a set of rules based at least in part on using different types of filler material with respect to the recommended package type and the dimensions to identify the recommended filler material from the different types of filler material.

Embodiment 11: The system of any of embodiments 8 to 10, wherein the operations further comprise: receiving identification of a prediction of a label for the item, wherein the at least one machine learning model processes at least one of the first image or the second image to generate the prediction of the label for the item, and generating the recommended package type is further based at least in part on the prediction of the label for the item.

Embodiment 12: The system of any of embodiments 8 to 11, wherein the dimensions comprise a width, a height, and a depth of the item, comparing the first bounding box to the second bounding box involves deriving the width and the height of the item, and comparing the third bounding box to the second bounding box involves deriving the depth of the item.

Embodiment 13: The system of any of embodiments 8 to 12, wherein the rules-based model applies a set of rules based at least in part on package dimensions for each package type of a plurality of package types to the dimensions of the item to identify the recommended package type to use in packing the item.

Embodiment 14: The system of any of embodiments 8 to 13, wherein the request comprises a description of the item, and the operations further comprise: generating, based at least in part on the description and the dimensions, an estimated weight of the item; generating, based at least in part on the estimated weight, an estimated cost for shipping the item; and communicating the estimated cost to the user computing device.

Embodiment 15: A computer-readable medium storing computer-executable instructions that, when executed by computing hardware, configure the computing hardware to perform operations comprising: receiving, from a user computing device, a request for a recommended package type for a first item and a second item, a first image of a top view of the first item and a reference item, a second image of a front view of the first item and the reference item, a third image of a top view of the second item and the reference item, and a fourth image of a front view of the second item and the reference item; receiving identification of a first bounding box, a second bounding box, a third bounding box, a fourth bounding box, a fifth bounding box, a sixth bounding box, seventh bounding box, and an eighth bounding box, wherein at least one machine learning model processes the first image, the second image, the third image, and the fourth image to: generate the first bounding box around the reference item and the second bounding box around the first item in the first image, generate the third bounding box around the reference item and the fourth bounding box around the first item in the second image, generate the fifth bounding box around the reference item and the sixth bounding box around the second item in the third image, and generate the seventh bounding box around the reference item and the eighth bounding box around the second item in the fourth image; comparing, based at least in part on reference dimensions for the reference item, the first bounding box to the second bounding box and the third bounding box to the fourth bounding box to generate first dimensions of the first item; comparing, based at least in part on the reference dimensions for the reference item, the fifth bounding box to the sixth bounding box and the seventh bounding box to the eighth bounding box to generate second dimensions of the second item; processing the first dimensions and the second dimensions to generate the recommended package type to use in packing the first item and the second item together; and communicating the recommended package type to the user computing device.

Embodiment 16: The computer-readable medium of embodiment 15, wherein the operations further comprise: receiving identification of a first prediction of a first label for the first item and a second prediction of a second label for the second item, wherein the at least one machine learning model processes at least one of the first image or the second image to generate the first prediction and processes at least one of the third image or the fourth image to generate the second prediction; responsive to at least one of the first prediction identifying the first item as fragile or the second prediction identifying the second item as fragile, processing the first dimensions, the second dimensions, and the recommended package type to generate a recommended filler material to use in packing the first item and the second item in the recommended package type; and communicating the recommended filler material to the user computing device.

Embodiment 17: The computer-readable medium of embodiment 16, wherein processing the first dimensions, the second dimensions, and the recommended package type to generate the recommended filler material involves processing the first dimensions, the second dimensions, and the recommended package type via a rules-based model that applies a set of rules based at least in part on using different types of filler material with respect to the first dimensions, the second dimensions, and the recommended package type to identify the recommended filler material from the different types of filler material.

Embodiment 18: The computer-readable medium of any of embodiments 15 to 17, wherein the first dimensions comprise a first width, a first height, and a first depth of the first item, the second dimensions comprise a second width, a second height, and a second depth of the second item, comparing the first bounding box to the second bounding box involves deriving the first width and the first height of the first item, comparing the third bounding box to the second bounding box involves deriving the first depth of the first item, comparing the fifth bounding box to the sixth bounding box involves deriving the second width and the second height of the second item, and comparing the seventh bounding box to the eighth bounding box involves deriving the second depth of the second item.

Embodiment 19: The computer-readable medium of any of embodiments 15 to 18, wherein processing the first dimensions and the second dimensions to generate the recommended package type involves processing the first dimensions and the second dimensions via a rules-based model that applies a set of rules based at least in part on package dimensions for each package type of a plurality of package types to the first dimensions and the second dimensions to identify the recommended package type to use in packing the first item and the second item together.

Embodiment 20: The computer-readable medium of any of embodiments 15 to 19, wherein the request comprises a first description of the first item and a second description of the second item, and the operations further comprise: generating, based at least in part on the first description and the first dimensions, a first estimated weight of the first item; generating, based at least in part on the second description and the second dimensions, a second estimated weight of the second item; generating, based at least in part on the first estimated weight and the second estimated weight, an estimated cost for shipping the first item and the second item together; and communicating the estimated cost to the user computing device.

CONCLUSION

While this specification contains many specific aspect details, these should not be construed as limitations on the scope of any invention or of what may be claimed, but rather as descriptions of features that may be specific to particular embodiments of particular inventions. Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various embodiments described above should not be understood as requiring such separation in all embodiments, and the described program components (e.g., modules) and systems may be integrated together in a single software product or packaged into multiple software products.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for the purposes of limitation.

In some embodiments, this disclosure may include the language "at least one of [element A] or [element B]." This language may refer to one or more of the elements. For example, "at least one of A or B" may refer to "A," "B," or "A and B." In other words, "at least one of A or B" may refer to "at least one of A and at least one of B," "at least one of A or B," or "A and B." In some embodiments, this disclosure may include the language, for example "[element A], [element B], and/or [element C]." This language may refer to either of the element or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A method comprising:

training, by the computing hardware, at least one machine learning model to generate a prediction of a label and a prediction of a bounding box, wherein (a) the at least one machine learning model is trained using a set of training images that comprises items and reference item in which each item and each reference item found in the set of training images is outlined with an actual bounding box and each item and each reference item found in the set of training images is labeled as one of a fragile item type, a non-fragile item type, or a reference item type, and (b) training is conducted by performing iterations involving (i) adjusting a probability threshold until the at least one machine learning model demonstrates a precision for generating the prediction of the label that satisfies a first level and a recall for generating the prediction of the label that satisfies a second level and (ii) adjusting an overlap threshold until the at least one machine learning model demonstrates generating the prediction of the bounding box having an overlap with the actual bounding box that satisfies a third level for each item and each reference item found in the set of training images;

receiving, by the computing hardware and from a user computing device, a request for a recommendation for packing the item, a first image of a top view of the item and a reference item, and a second image of a front view of the item and the reference item, wherein the request identifies reference dimensions for the reference item;

processing, by the computing hardware, the first image and the second image using the at least one machine learning model to:

generate the prediction of a first bounding box for the reference item and the prediction of a second bounding box for the item in the first image, generate the prediction of a third bounding box for the reference item and the prediction of a fourth bounding box for the item in the second image, generate the prediction of a first label for the reference item, wherein the prediction of the first label indicates the reference item is the reference item type, and generate the prediction of a second label for the item based at least in part on a texture of the item detected from at least one of the first image or the second image, wherein the prediction of the second label indicates the item is the fragile item type or the non-fragile item type;

comparing, by the computing hardware and based at least in part on the reference dimensions, the first bounding box to the second bounding box and the third bounding box to the fourth bounding box to generate dimensions of the item by:

analyzing the first bounding box to establish that a first certain number of pixels in the first image is equal to a certain measurement based at least in part on the reference dimensions to establish a first measurement scale;

applying the first measurement scale to the second bounding box to determine at least a first portion of the dimensions of the item;

analyzing the third bounding box to establish that a second certain number of pixels in the second image is equal to the certain measurement based at least in part on the reference dimensions to establish a second measurement scale; and applying the second measurement scale to the fourth bounding box to determine at least a second portion of the dimensions of the item;

processing, by the computing hardware using a rules-based model, the prediction of the second label for the item and the dimensions to generate the recommendation for packing the item, wherein the recommendation identifies a recommended package type to use in packing the item; and communicating, by the computing hardware, the recommendation to the user computing device.

2. The method of claim 1, wherein the first portion of the dimensions comprises a width and a height, and the second portion of the dimensions comprises a depth of the item.

3. The method of claim 1, wherein the rules-based model applies a set of rules based at least in part on package dimensions for each package type of a plurality of package types to the dimensions of the item to identify the recommended package type to use in packing the item.

4. The method of claim 1, wherein the prediction of the second label identifies the item as the fragile item type, and the recommendation identifies a recommended filler material to use in packing the item in the recommended package type.

5. The method of claim 4, wherein the rules-based model applies a set of rules based at least in part on using different types of filler material with respect to the recommended package type and the dimensions to identify the recommended filler material from the different types of filler material.

6. The method of claim 1, wherein the request comprises a description of the item, the recommendation comprises an estimated cost for shipping the item, and the method further comprises:

generating, by the computing hardware and based at least in part on the description and the dimensions, an estimated weight of the item; and generating, by the computing hardware and based at least in part on the estimated weight, the estimated cost.

7. A system comprising:

a non-transitory computer-readable medium storing instructions; and a processing device communicatively coupled to the non-transitory computer-readable medium, wherein the processing device is configured to execute the instructions and thereby perform operations comprising:

training at least one machine learning model to generate a prediction of a label and a prediction of a bounding box, wherein (a) the at least one machine learning model is trained using a set of training images that comprises items and reference item in which each item and each reference item found in the set of training images is outlined with an actual bounding box and each item and each reference item found in the set of training images is labeled as one of an item type or a reference item type, and (b) training is conducted by performing iterations involving (i) adjusting a probability threshold until the at least one machine learning model demonstrates a precision for generating the prediction of the label that satisfies a first level and a recall for generating the prediction of the label that satisfies a second level and (ii) adjusting an overlap threshold until the at least one machine learning model demonstrates generating the prediction of the bounding box having an overlap with the actual bounding box that satisfies a third level for each item and each reference item found in the set of training images;

receiving, from a user computing device, a request for a recommended package type for the item, a first image of a top view of the item and a reference item, and a second image of a front view of the item and the reference item, wherein the request identifies reference dimensions for the reference item; receiving identification of a first bounding box, a second bounding box, a third bounding box, a fourth bounding box, a first label, and a second label, wherein the at least one machine learning model processes the first image and the second image to:

generate the prediction of the first label for the reference item, wherein the prediction of the first label indicates the reference item is the reference item type, generate the prediction of the second label for the item, wherein the prediction of the second label indicates the item is the item type, generate the prediction of the first bounding box for the reference item and the prediction for the second bounding box for the item in the first image, and generate the prediction of the third bounding box for the reference item and the prediction of the fourth bounding box for the item in the second image;

comparing, based at least in part on the reference dimensions, the first bounding box to the second bounding box and the third bounding box to the fourth bounding box to generate dimensions of the item by:

analyzing the first bounding box to establish that a first certain number of pixels in the first image is equal to a certain measurement based at least in part on the reference dimensions to establish a first measurement scale;

applying the first measurement scale to the second bounding box to determine at least a first portion of the dimensions of the item;

analyzing the third bounding box to establish that a second certain number of pixels in the second image is equal to the certain measurement based at least in part on the reference dimensions to establish a second measurement scale; and applying the second measurement scale to the fourth bounding box to determine at least a second portion of the dimensions of the item;

processing, using a rules-based model, the dimensions to generate the recommended package type to use in packing the item; and communicating the recommended package type to the user computing device.

8. The system of claim 7, wherein the second label further indicates the item is fragile, and the operations further comprise:

responsive to the prediction of the second label identifying the item as fragile, processing, using the rules-based model, the dimensions and the recommended package type to generate a recommended filler material to use in packing the item in the recommended package type; and communicating the recommended filler material to the user computing device.

9. The system of claim 8, wherein the rules-based model applies a set of rules based at least in part on using different types of filler material with respect to the recommended package type and the dimensions to identify the recommended filler material from the different types of filler material.

10. The system of claim 7, wherein generating the recommended package type is further based at least in part on the prediction of the second label for the item.

11. The system of claim 7, wherein the first portion of the dimensions comprise a width and a height, and the second portion of the dimensions comprises a depth of the item.

12. The system of claim 7, wherein the rules-based model applies a set of rules based at least in part on package dimensions for each package type of a plurality of package types to the dimensions of the item to identify the recommended package type to use in packing the item.

13. The system of claim 7, wherein the request comprises a description of the item, and the operations further comprise:

generating, based at least in part on the description and the dimensions, an estimated weight of the item;

generating, based at least in part on the estimated weight, an estimated cost for shipping the item; and communicating the estimated cost to the user computing device.

14. A non-transitory computer-readable medium storing computer-executable instructions that, when executed by computing hardware, configure the computing hardware to perform operations comprising:

training at least one machine learning model to generate a prediction of a label and a prediction of a bounding box, wherein (a) the at least one machine learning model is trained using a set of training images that comprises items and reference items in which each item and each reference item found in the set of training images is outlined with an actual bounding box and each item and each reference item found in the set of training images is labeled as one of an item type or a reference item type, and (b) training is conducted by performing iterations involving (i) adjusting a probability threshold until the at least one machine learning model demonstrates a precision for generating the prediction of the label that satisfies a first level and a recall for generating the prediction of the label that satisfies a second level and (ii) adjusting an overlap threshold until the at least one machine learning model demonstrates generating the prediction of the bounding box having an overlap with the actual bounding box that satisfies a third level for each item and each reference item found in the set of training images;

receiving, from a user computing device, a request for a recommended package type for a first item and a second item, a first image of a top view of the first item and a reference item, a second image of a front view of the first item and the reference item, a third image of a top view of the second item and the reference item, and a fourth image of a front view of the second item and the reference item;

receiving identification of a first bounding box, a second bounding box, a third bounding box, a fourth bounding box, a fifth bounding box, a sixth bounding box, a seventh bounding box, an eighth bounding box, a first label, a second label, and a third label, wherein at least one machine learning model processes the first image, the second image, the third image, and the fourth image to:

generate the prediction of the first label for the reference item, wherein the prediction of the first label indicates the reference item is the reference item type, generate the prediction of the second label for the first item, wherein the prediction of the second label indicates the item is the item type, generate the prediction of the third label for the second item, wherein the prediction of the third label indicates the second item is the item type, generate the prediction of first bounding box for the reference item and the prediction of the second bounding box for the first item in the first image, generate the prediction of the third bounding box for the reference item and the prediction of the fourth bounding box for the first item in the second image, generate the prediction of the fifth bounding box for the reference item and the prediction of the sixth bounding box for the second item in the third image, and generate the prediction of the seventh bounding box for the reference item and the prediction of the eighth bounding box for the second item in the fourth image;

comparing, based at least in part on reference dimensions for the reference item, the first bounding box to the second bounding box and the third bounding box to the fourth bounding box to generate first dimensions of the first item by:

analyzing the first bounding box to establish that a first certain number of pixels in the first image is equal to a certain measurement based at least in part on the reference dimensions to establish a first measurement scale;

applying the first measurement scale to the second bounding box to determine at least a first portion of the dimensions of the first item;

analyzing the third bounding box to establish that a second certain number of pixels in the second image is equal to the certain measurement based at least in part on the reference dimensions to establish a second measurement scale; and applying the second measurement scale to the fourth bounding box to determine at least a second portion of the dimensions of the first item;

comparing, based at least in part on the reference dimensions for the reference item, the fifth bounding box to the sixth bounding box and the seventh bounding box to the eighth bounding box to generate second dimensions of the second item by:

analyzing the fifth bounding box to establish that a third certain number of pixels in the third image is equal to the certain measurement based at least in part on the reference dimensions to establish a third measurement scale;

applying the third measurement scale to the sixth bounding box to determine at least a first portion of the second dimensions of the second item;

analyzing the seventh bounding box to establish that a fourth certain number of pixels in the fourth image is equal to the certain measurement based at least in part on the reference dimensions to establish a fourth measurement scale; and applying the fourth measurement scale to the eighth bounding box to determine at least a second portion of the second dimensions of the second item;

processing the first dimensions and the second dimensions to generate the recommended package type to use in packing the first item and the second item together; and communicating the recommended package type to the user computing device.

15. The computer-readable medium of claim 14, wherein at least one of the second label identifies the first item as fragile or the third label identifies the second item as fragile, and the operations further comprise:

responsive to at least one of the second label identifying the first item as fragile or the second prediction identifying the second item as fragile, processing the first dimensions, the second dimensions, and the recommended package type to generate a recommended filler material to use in packing the first item and the second item in the recommended package type; and communicating the recommended filler material to the user computing device.

16. The computer-readable medium of claim 15, wherein processing the first dimensions, the second dimensions, and the recommended package type to generate the recommended filler material involves processing the first dimensions, the second dimensions, and the recommended package type via a rules-based model that applies a set of rules based at least in part on using different types of filler material with respect to the first dimensions, the second dimensions, and the recommended package type to identify the recommended filler material from the different types of filler material.

17. The computer-readable medium of claim 14, wherein the first portion of the first dimensions comprises a first width and a first height of the first item, and the second portion of the first dimensions comprises a first depth of the first item, the first portion of the second dimensions comprises a second width and a second height of the second item, and the second portion of the second dimensions comprises a second depth of the second item, comparing the first bounding box to the second bounding box involves deriving the first width and the first height of the first item, comparing the third bounding box to the fourth bounding box involves deriving the first depth of the first item, comparing the fifth bounding box to the sixth bounding box involves deriving the second width and the second height of the second item, and comparing the seventh bounding box to the eighth bounding box involves deriving the second depth of the second item.

18. The computer-readable medium of claim 14, wherein processing the first dimensions and the second dimensions to generate the recommended package type involves processing the first dimensions and the second dimensions via a rules-based model that applies a set of rules based at least in part on package dimensions for each package type of a plurality of package types to the first dimensions and the second dimensions to identify the recommended package type to use in packing the first item and the second item together.

19. The computer-readable medium of claim 14, wherein the request comprises a first description of the first item and a second description of the second item, and the operations further comprise:

generating, based at least in part on the first description and the first dimensions, a first estimated weight of the first item;

generating, based at least in part on the second description and the second dimensions, a second estimated weight of the second item;

generating, based at least in part on the first estimated weight and the second estimated weight, an estimated cost for shipping the first item and the second item together; and communicating the estimated cost to the user computing device.

* * * * *